United States Patent
Gupta et al.

(10) Patent No.: US 9,720,601 B2
(45) Date of Patent: Aug. 1, 2017

(54) LOAD BALANCING TECHNIQUE FOR A STORAGE ARRAY

(71) Applicant: NetApp, Inc., Sunnyvale, CA (US)

(72) Inventors: Anish Gupta, Daly City, CA (US); Samiullah Mohammed, Sunnyvale, CA (US); Jamie Nguyen, San Jose, CA (US); Hung Lu, San Jose, CA (US)

(73) Assignee: NetApp, Inc., Sunnyvale, CA (US)

(*) Notice: Subject to any disclaimer, the term of this patent is extended or adjusted under 35 U.S.C. 154(b) by 25 days.

(21) Appl. No.: 14/619,934

(22) Filed: Feb. 11, 2015

(65) Prior Publication Data

US 2016/0231948 A1    Aug. 11, 2016

(51) Int. Cl.
G06F 3/06    (2006.01)

(52) U.S. Cl.
CPC .......... *G06F 3/0611* (2013.01); *G06F 3/0653* (2013.01); *G06F 3/0659* (2013.01); *G06F 3/0688* (2013.01)

(58) Field of Classification Search
CPC .. G06F 12/0246; G06F 3/0689; G06F 3/0635; G06F 3/0688; G06F 3/061; G06F 2009/45595; G06F 2009/45579; G06F 2212/7208; G06F 2206/1012; G06F 3/0611; G06F 3/0659; G06F 3/0653
See application file for complete search history.

(56) References Cited

U.S. PATENT DOCUMENTS

| | | | |
|---|---|---|---|
| 5,459,857 A | 10/1995 | Ludlam et al. |
| 5,511,190 A | 4/1996 | Sharma et al. |
| 5,937,425 A | 8/1999 | Ban |
| 5,991,862 A | 11/1999 | Ruane |

(Continued)

FOREIGN PATENT DOCUMENTS

| | | |
|---|---|---|
| EP | 0726521 A2 | 8/1996 |
| EP | 1970821 A1 | 9/2008 |

(Continued)

OTHER PUBLICATIONS

Agrawal, et al. "Design Tradeoffs for SSD Performance." USENIX Annual Technical Conference, 2008. (14 Pages).

(Continued)

*Primary Examiner* — Hiep Nguyen
(74) *Attorney, Agent, or Firm* — Cesari and McKenna, LLP

(57) ABSTRACT

A technique for load balancing uses heuristic-based algorithms with respect to input/output (I/O) latency of workloads destined to storage devices, e.g., solid state drives (SSDs), of a storage array attached to a storage system. Illustratively, "front-end" requests received from a host result in a back-end workload as those requests are processed by a storage I/O stack of the storage system and stored on the storage array. Accordingly, the technique maintains a consistent latency for the host requests (front-end) to control latency for the back-end workload. The load balancing technique illustratively load balances fixed (back-end) workloads having similar I/O sizes and I/O patterns. Illustratively, the technique balances the workloads across a plurality of storage ports over one or more I/O paths to the SSDs. Access to the SSDs may then be distributed among the storage ports.

20 Claims, 9 Drawing Sheets

(56) References Cited

U.S. PATENT DOCUMENTS

| | | | |
|---|---|---|---|
| 6,219,800 | B1 | 4/2001 | Johnson et al. |
| 6,257,756 | B1 | 7/2001 | Zarubinsky et al. |
| 6,275,898 | B1 | 8/2001 | DeKoning |
| 6,347,337 | B1 | 2/2002 | Shah et al. |
| 6,434,662 | B1 | 8/2002 | Greene et al. |
| 6,526,478 | B1 | 2/2003 | Kirby |
| 6,560,196 | B1 | 5/2003 | Wei |
| 6,578,158 | B1 | 6/2003 | Deitz et al. |
| 6,604,155 | B1 | 8/2003 | Chong, Jr. |
| 6,609,176 | B1 | 8/2003 | Mizuno |
| 6,704,839 | B2 | 3/2004 | Butterworth et al. |
| 6,741,698 | B1 | 5/2004 | Jensen |
| 6,779,003 | B1 | 8/2004 | Midgley et al. |
| 6,895,500 | B1 | 5/2005 | Rothberg |
| 6,904,470 | B1 * | 6/2005 | Ofer .............. G06F 3/061 710/6 |
| 6,912,645 | B2 | 6/2005 | Dorward et al. |
| 6,928,526 | B1 | 8/2005 | Zhu et al. |
| 7,047,358 | B2 | 5/2006 | Lee et al. |
| 7,055,058 | B2 | 5/2006 | Lee et al. |
| 7,065,619 | B1 | 6/2006 | Zhu et al. |
| 7,093,086 | B1 | 8/2006 | Van |
| 7,110,913 | B2 | 9/2006 | Monroe et al. |
| 7,174,379 | B2 | 2/2007 | Agarwal et al. |
| 7,188,149 | B2 | 3/2007 | Kishimoto et al. |
| 7,191,357 | B2 | 3/2007 | Holland et al. |
| 7,249,150 | B1 | 7/2007 | Watanabe et al. |
| 7,251,663 | B1 | 7/2007 | Smith |
| 7,257,690 | B1 | 8/2007 | Baird |
| 7,325,059 | B2 | 1/2008 | Barach et al. |
| 7,334,094 | B2 | 2/2008 | Fair |
| 7,334,095 | B1 | 2/2008 | Fair et al. |
| 7,366,865 | B2 | 4/2008 | Lakshmanamurthy et al. |
| 7,370,048 | B2 | 5/2008 | Loeb |
| 7,373,345 | B2 | 5/2008 | Carpentier et al. |
| 7,394,944 | B2 | 7/2008 | Boskovic et al. |
| 7,395,352 | B1 | 7/2008 | Lam et al. |
| 7,415,653 | B1 | 8/2008 | Bonwick et al. |
| 7,451,167 | B2 | 11/2008 | Bali et al. |
| 7,457,864 | B2 | 11/2008 | Chambliss et al. |
| 7,464,125 | B1 | 12/2008 | Orszag et al. |
| 7,529,780 | B1 | 5/2009 | Braginsky et al. |
| 7,529,830 | B2 | 5/2009 | Fujii |
| 7,543,100 | B2 | 6/2009 | Singhal et al. |
| 7,543,178 | B2 | 6/2009 | McNeill et al. |
| 7,562,101 | B1 | 7/2009 | Jernigan, IV et al. |
| 7,562,203 | B2 | 7/2009 | Scott et al. |
| 7,603,391 | B1 | 10/2009 | Federwisch et al. |
| 7,603,529 | B1 | 10/2009 | MacHardy et al. |
| 7,644,087 | B2 | 1/2010 | Barkai et al. |
| 7,668,885 | B2 | 2/2010 | Wittke et al. |
| 7,680,837 | B2 | 3/2010 | Yamato |
| 7,681,076 | B1 | 3/2010 | Sarma |
| 7,701,948 | B2 | 4/2010 | Rabje et al. |
| 7,743,035 | B2 | 6/2010 | Chen et al. |
| 7,757,056 | B1 | 7/2010 | Fair |
| 7,797,279 | B1 | 9/2010 | Starling et al. |
| 7,814,064 | B2 | 10/2010 | Vingralek |
| 7,818,525 | B1 | 10/2010 | Frost et al. |
| 7,831,769 | B1 | 11/2010 | Wen et al. |
| 7,849,098 | B1 * | 12/2010 | Scales .............. G06F 17/30067 707/781 |
| 7,873,619 | B1 | 1/2011 | Faibish et al. |
| 7,899,791 | B1 | 3/2011 | Gole |
| 7,917,726 | B2 | 3/2011 | Hummel et al. |
| 7,921,169 | B2 | 4/2011 | Jacobs et al. |
| 7,921,325 | B2 | 4/2011 | Kondo et al. |
| 7,949,693 | B1 | 5/2011 | Mason et al. |
| 7,987,167 | B1 | 7/2011 | Kazar et al. |
| 7,996,636 | B1 | 8/2011 | Prakash et al. |
| 8,060,797 | B2 | 11/2011 | Hida et al. |
| 8,074,019 | B2 | 12/2011 | Gupta et al. |
| 8,078,918 | B2 | 12/2011 | Diggs et al. |
| 8,082,390 | B1 | 12/2011 | Fan et al. |
| 8,086,585 | B1 | 12/2011 | Brashers et al. |
| 8,089,969 | B2 | 1/2012 | Rabie et al. |
| 8,099,396 | B1 | 1/2012 | Novick et al. |
| 8,099,554 | B1 | 1/2012 | Solomon et al. |
| 8,127,182 | B2 | 2/2012 | Sivaperuman et al. |
| 8,131,926 | B2 | 3/2012 | Lubbers et al. |
| 8,140,821 | B1 | 3/2012 | Raizen et al. |
| 8,140,860 | B2 | 3/2012 | Haswell |
| 8,145,838 | B1 | 3/2012 | Miller et al. |
| 8,156,016 | B2 | 4/2012 | Zhang |
| 8,156,290 | B1 | 4/2012 | Vanninen et al. |
| 8,156,306 | B1 | 4/2012 | Raizen et al. |
| 8,184,807 | B2 | 5/2012 | Kato et al. |
| 8,205,065 | B2 | 6/2012 | Matze |
| 8,209,587 | B1 | 6/2012 | Taylor et al. |
| 8,214,868 | B2 | 7/2012 | Hamilton et al. |
| 8,224,935 | B1 | 7/2012 | Bandopadhyay et al. |
| 8,244,978 | B2 | 8/2012 | Kegel et al. |
| 8,250,116 | B2 | 8/2012 | Mazzagatti et al. |
| 8,261,085 | B1 | 9/2012 | Fernandez |
| 8,327,103 | B1 | 12/2012 | Can et al. |
| 8,341,457 | B2 | 12/2012 | Spry et al. |
| 8,369,217 | B2 | 2/2013 | Bostica et al. |
| 8,417,987 | B1 | 4/2013 | Goel et al. |
| 8,452,929 | B2 | 5/2013 | Bennett |
| 8,463,825 | B1 | 6/2013 | Harty et al. |
| 8,468,368 | B2 | 6/2013 | Gladwin et al. |
| 8,489,811 | B1 | 7/2013 | Corbett et al. |
| 8,495,417 | B2 | 7/2013 | Jernigan, IV et al. |
| 8,520,855 | B1 | 8/2013 | Kohno et al. |
| 8,539,008 | B2 | 9/2013 | Faith et al. |
| 8,560,879 | B1 | 10/2013 | Goel |
| 8,566,617 | B1 | 10/2013 | Clifford |
| 8,583,865 | B1 | 11/2013 | Sade et al. |
| 8,589,625 | B2 | 11/2013 | Colgrove et al. |
| 8,595,434 | B2 | 11/2013 | Northcutt et al. |
| 8,595,595 | B1 | 11/2013 | Grcanac et al. |
| 8,600,949 | B2 | 12/2013 | Periyagaram et al. |
| 8,645,664 | B1 | 2/2014 | Colgrove et al. |
| 8,645,698 | B2 | 2/2014 | Yi et al. |
| 8,671,265 | B2 | 3/2014 | Wright |
| 8,706,701 | B1 | 4/2014 | Stefanov et al. |
| 8,732,426 | B2 | 5/2014 | Colgrove et al. |
| 8,751,763 | B1 | 6/2014 | Ramarao |
| 8,762,654 | B1 | 6/2014 | Yang et al. |
| 8,775,868 | B2 | 7/2014 | Colgrove et al. |
| 8,782,439 | B2 | 7/2014 | Resch |
| 8,787,580 | B2 | 7/2014 | Hodges et al. |
| 8,799,571 | B1 | 8/2014 | Desroches et al. |
| 8,799,705 | B2 | 8/2014 | Hallak et al. |
| 8,806,115 | B1 | 8/2014 | Patel et al. |
| 8,806,160 | B2 | 8/2014 | Colgrove et al. |
| 8,824,686 | B1 | 9/2014 | Ishii et al. |
| 8,832,363 | B1 | 9/2014 | Sundaram et al. |
| 8,832,373 | B2 | 9/2014 | Colgrove et al. |
| 8,839,008 | B2 | 9/2014 | Maniktala |
| 8,850,108 | B1 | 9/2014 | Hayes et al. |
| 8,855,318 | B1 | 10/2014 | Patnala et al. |
| 8,856,593 | B2 | 10/2014 | Eckhardt et al. |
| 8,874,842 | B1 | 10/2014 | Kimmel et al. |
| 8,880,787 | B1 | 11/2014 | Kimmel et al. |
| 8,892,818 | B1 | 11/2014 | Zheng et al. |
| 8,904,231 | B2 | 12/2014 | Coatney et al. |
| 8,922,928 | B2 | 12/2014 | Powell |
| 8,930,778 | B2 | 1/2015 | Cohen |
| 8,943,032 | B1 | 1/2015 | Xu et al. |
| 8,943,282 | B1 | 1/2015 | Armangau et al. |
| 8,949,568 | B2 | 2/2015 | Wei et al. |
| 8,977,781 | B1 | 3/2015 | Yokoi et al. |
| 8,996,468 | B1 | 3/2015 | Mattox |
| 8,996,535 | B1 | 3/2015 | Kimmel et al. |
| 8,996,790 | B1 | 3/2015 | Segal et al. |
| 8,996,797 | B1 | 3/2015 | Zheng et al. |
| 9,003,162 | B2 | 4/2015 | Lomet et al. |
| 9,009,449 | B2 | 4/2015 | Chou et al. |
| 9,037,544 | B1 | 5/2015 | Zheng et al. |
| 9,058,119 | B1 | 6/2015 | Ray, III et al. |
| 9,092,142 | B2 | 7/2015 | Nashimoto et al. |
| 9,152,684 | B2 | 10/2015 | Zheng et al. |
| 9,195,939 | B1 | 11/2015 | Goyal et al. |

(56) References Cited

U.S. PATENT DOCUMENTS

| | | | |
|---|---|---|---|
| 9,229,642 B2 | 1/2016 | Shu et al. | |
| 9,256,549 B2 | 2/2016 | Kimmel et al. | |
| 9,268,502 B2 | 2/2016 | Zheng et al. | |
| 9,274,901 B2 | 3/2016 | Veerla et al. | |
| 9,298,417 B1 | 3/2016 | Muddu et al. | |
| 9,367,241 B2 | 6/2016 | Sundaram et al. | |
| 9,389,958 B2 | 7/2016 | Sundaram et al. | |
| 9,405,783 B2 | 8/2016 | Kimmel et al. | |
| 9,459,856 B2 | 10/2016 | Curzi et al. | |
| 9,471,680 B2* | 10/2016 | Elsner | G06F 17/30858 |
| 2002/0073068 A1 | 6/2002 | Guha | |
| 2002/0073354 A1 | 6/2002 | Schroiff et al. | |
| 2002/0091897 A1 | 7/2002 | Chiu et al. | |
| 2002/0156891 A1 | 10/2002 | Ulrich et al. | |
| 2002/0174419 A1 | 11/2002 | Alvarez et al. | |
| 2002/0188711 A1 | 12/2002 | Meyer et al. | |
| 2003/0005147 A1 | 1/2003 | Enns et al. | |
| 2003/0105928 A1 | 6/2003 | Ash et al. | |
| 2003/0115204 A1 | 6/2003 | Greenblatt et al. | |
| 2003/0115282 A1 | 6/2003 | Rose | |
| 2003/0120869 A1 | 6/2003 | Lee et al. | |
| 2003/0126118 A1 | 7/2003 | Burton et al. | |
| 2003/0126143 A1 | 7/2003 | Roussopoulos et al. | |
| 2003/0135729 A1 | 7/2003 | Mason et al. | |
| 2003/0159007 A1 | 8/2003 | Sawdon et al. | |
| 2003/0163628 A1 | 8/2003 | Lin et al. | |
| 2003/0172059 A1 | 9/2003 | Andrei | |
| 2003/0191916 A1 | 10/2003 | McBrearty et al. | |
| 2003/0195895 A1 | 10/2003 | Nowicki et al. | |
| 2003/0200388 A1 | 10/2003 | Hetrick | |
| 2003/0212872 A1 | 11/2003 | Patterson et al. | |
| 2003/0223445 A1 | 12/2003 | Lodha | |
| 2004/0003173 A1 | 1/2004 | Yao et al. | |
| 2004/0052254 A1 | 3/2004 | Hooper | |
| 2004/0054656 A1 | 3/2004 | Leung et al. | |
| 2004/0107281 A1 | 6/2004 | Bose et al. | |
| 2004/0133590 A1 | 7/2004 | Henderson et al. | |
| 2004/0133622 A1 | 7/2004 | Clubb et al. | |
| 2004/0133742 A1 | 7/2004 | Vasudevan et al. | |
| 2004/0153544 A1 | 8/2004 | Kelliher et al. | |
| 2004/0153863 A1 | 8/2004 | Klotz et al. | |
| 2004/0215792 A1 | 10/2004 | Koning et al. | |
| 2004/0236846 A1 | 11/2004 | Alvarez et al. | |
| 2005/0027817 A1 | 2/2005 | Novik et al. | |
| 2005/0043834 A1 | 2/2005 | Rotariu et al. | |
| 2005/0076113 A1 | 4/2005 | Klotz et al. | |
| 2005/0076115 A1 | 4/2005 | Andrews et al. | |
| 2005/0091261 A1 | 4/2005 | Wu et al. | |
| 2005/0128951 A1 | 6/2005 | Chawla et al. | |
| 2005/0144514 A1 | 6/2005 | Ulrich et al. | |
| 2005/0177770 A1 | 8/2005 | Coatney et al. | |
| 2005/0203930 A1 | 9/2005 | Bukowski et al. | |
| 2005/0246362 A1 | 11/2005 | Borland | |
| 2005/0246398 A1 | 11/2005 | Barzilai et al. | |
| 2006/0004957 A1 | 1/2006 | Hand, III | |
| 2006/0071845 A1 | 4/2006 | Stroili et al. | |
| 2006/0072555 A1 | 4/2006 | St. Hilaire et al. | |
| 2006/0072593 A1 | 4/2006 | Grippo et al. | |
| 2006/0074977 A1 | 4/2006 | Kothuri et al. | |
| 2006/0129676 A1 | 6/2006 | Modi et al. | |
| 2006/0136718 A1 | 6/2006 | Moreillon | |
| 2006/0156059 A1 | 7/2006 | Kitamura | |
| 2006/0165074 A1 | 7/2006 | Modi et al. | |
| 2006/0206671 A1* | 9/2006 | Aiello | G06F 3/0607 711/148 |
| 2006/0232826 A1 | 10/2006 | Bar-El | |
| 2006/0282662 A1 | 12/2006 | Whitcomb | |
| 2006/0288151 A1 | 12/2006 | McKenney | |
| 2007/0033433 A1 | 2/2007 | Pecone et al. | |
| 2007/0061572 A1 | 3/2007 | Imai et al. | |
| 2007/0064604 A1 | 3/2007 | Chen et al. | |
| 2007/0083482 A1 | 4/2007 | Rathi et al. | |
| 2007/0083722 A1 | 4/2007 | Per et al. | |
| 2007/0094452 A1 | 4/2007 | Fachan | |
| 2007/0112723 A1 | 5/2007 | Alvarez et al. | |
| 2007/0136269 A1 | 6/2007 | Yamakabe et al. | |
| 2007/0143359 A1 | 6/2007 | Uppala | |
| 2007/0186066 A1 | 8/2007 | Desai et al. | |
| 2007/0186127 A1 | 8/2007 | Desai et al. | |
| 2007/0208918 A1 | 9/2007 | Harbin et al. | |
| 2007/0234106 A1 | 10/2007 | Lecrone et al. | |
| 2007/0245041 A1 | 10/2007 | Hua et al. | |
| 2007/0266037 A1 | 11/2007 | Terry et al. | |
| 2008/0065639 A1 | 3/2008 | Choudhary et al. | |
| 2008/0071939 A1* | 3/2008 | Tanaka | G06F 11/3419 710/18 |
| 2008/0104264 A1* | 5/2008 | Duerk | H04L 69/324 709/230 |
| 2008/0126695 A1 | 5/2008 | Berg | |
| 2008/0127211 A1 | 5/2008 | Belsey et al. | |
| 2008/0155190 A1 | 6/2008 | Ash et al. | |
| 2008/0165899 A1 | 7/2008 | Rahman et al. | |
| 2008/0201535 A1 | 8/2008 | Hara | |
| 2008/0244158 A1 | 10/2008 | Funatsu et al. | |
| 2008/0250270 A1 | 10/2008 | Bennett | |
| 2008/0270820 A1 | 10/2008 | Kondo et al. | |
| 2009/0031083 A1 | 1/2009 | Willis et al. | |
| 2009/0037500 A1 | 2/2009 | Kirshenbaum | |
| 2009/0037654 A1 | 2/2009 | Allison et al. | |
| 2009/0083478 A1 | 3/2009 | Kunimatsu et al. | |
| 2009/0097654 A1 | 4/2009 | Blake | |
| 2009/0132770 A1 | 5/2009 | Lin et al. | |
| 2009/0144497 A1 | 6/2009 | Withers | |
| 2009/0150537 A1 | 6/2009 | Fanson | |
| 2009/0157870 A1 | 6/2009 | Nakadai | |
| 2009/0210611 A1* | 8/2009 | Mizushima | G06F 12/0866 711/103 |
| 2009/0225657 A1 | 9/2009 | Haggar et al. | |
| 2009/0271412 A1 | 10/2009 | Lacapra et al. | |
| 2009/0276567 A1 | 11/2009 | Burkey | |
| 2009/0285476 A1 | 11/2009 | Choe et al. | |
| 2009/0313503 A1 | 12/2009 | Atluri et al. | |
| 2010/0011037 A1 | 1/2010 | Kazar | |
| 2010/0023726 A1 | 1/2010 | Aviles | |
| 2010/0030981 A1 | 2/2010 | Cook | |
| 2010/0031315 A1 | 2/2010 | Feng et al. | |
| 2010/0042790 A1 | 2/2010 | Mondal et al. | |
| 2010/0057792 A1 | 3/2010 | Ylonen | |
| 2010/0077380 A1 | 3/2010 | Baker et al. | |
| 2010/0082648 A1 | 4/2010 | Potapov et al. | |
| 2010/0088296 A1 | 4/2010 | Periyagaram et al. | |
| 2010/0122148 A1 | 5/2010 | Flynn et al. | |
| 2010/0161850 A1 | 6/2010 | Otsuka | |
| 2010/0169415 A1 | 7/2010 | Leggette et al. | |
| 2010/0174714 A1 | 7/2010 | Asmundsson et al. | |
| 2010/0199009 A1 | 8/2010 | Koide | |
| 2010/0199040 A1 | 8/2010 | Schnapp et al. | |
| 2010/0205353 A1 | 8/2010 | Miyamoto et al. | |
| 2010/0205390 A1 | 8/2010 | Arakawa | |
| 2010/0223385 A1 | 9/2010 | Gulley et al. | |
| 2010/0228795 A1 | 9/2010 | Hahn et al. | |
| 2010/0228999 A1 | 9/2010 | Maheshwari et al. | |
| 2010/0250497 A1 | 9/2010 | Redlich et al. | |
| 2010/0250712 A1 | 9/2010 | Ellison et al. | |
| 2010/0262812 A1 | 10/2010 | Lopez et al. | |
| 2010/0268983 A1 | 10/2010 | Raghunandan | |
| 2010/0281080 A1 | 11/2010 | Rajaram et al. | |
| 2010/0293147 A1 | 11/2010 | Snow et al. | |
| 2010/0306468 A1 | 12/2010 | Shionoya | |
| 2011/0022778 A1 | 1/2011 | Schibilla et al. | |
| 2011/0035548 A1 | 2/2011 | Kimmel et al. | |
| 2011/0060876 A1 | 3/2011 | Liu | |
| 2011/0066808 A1 | 3/2011 | Flynn et al. | |
| 2011/0072008 A1 | 3/2011 | Mandal et al. | |
| 2011/0078496 A1 | 3/2011 | Jeddeloh | |
| 2011/0087929 A1 | 4/2011 | Koshiyama | |
| 2011/0093674 A1 | 4/2011 | Frame et al. | |
| 2011/0099342 A1 | 4/2011 | Ozdemir | |
| 2011/0099419 A1 | 4/2011 | Lucas et al. | |
| 2011/0126045 A1 | 5/2011 | Bennett | |
| 2011/0153719 A1 | 6/2011 | Santoro et al. | |
| 2011/0154103 A1 | 6/2011 | Bulusu et al. | |
| 2011/0161293 A1 | 6/2011 | Vermeulen et al. | |
| 2011/0161725 A1 | 6/2011 | Allen et al. | |

(56) References Cited

U.S. PATENT DOCUMENTS

| | | |
|---|---|---|
| 2011/0191389 A1 | 8/2011 | Okamoto |
| 2011/0191522 A1 | 8/2011 | Condict et al. |
| 2011/0213928 A1 | 9/2011 | Grube et al. |
| 2011/0219106 A1 | 9/2011 | Wright |
| 2011/0238857 A1 | 9/2011 | Certain et al. |
| 2011/0246821 A1 | 10/2011 | Eleftheriou et al. |
| 2011/0283048 A1 | 11/2011 | Feldman et al. |
| 2011/0289565 A1 | 11/2011 | Resch et al. |
| 2011/0296133 A1 | 12/2011 | Flynn et al. |
| 2011/0307530 A1 | 12/2011 | Patterson |
| 2011/0314346 A1 | 12/2011 | Vas et al. |
| 2012/0003940 A1 | 1/2012 | Hirano et al. |
| 2012/0011176 A1 | 1/2012 | Aizman |
| 2012/0011340 A1 | 1/2012 | Flynn et al. |
| 2012/0016840 A1 | 1/2012 | Lin et al. |
| 2012/0063306 A1 | 3/2012 | Sultan et al. |
| 2012/0072656 A1 | 3/2012 | Archak et al. |
| 2012/0072680 A1 | 3/2012 | Kimura et al. |
| 2012/0078856 A1 | 3/2012 | Linde |
| 2012/0084506 A1 | 4/2012 | Colgrove et al. |
| 2012/0124282 A1 | 5/2012 | Frank et al. |
| 2012/0136834 A1 | 5/2012 | Zhao |
| 2012/0143877 A1 | 6/2012 | Kumar et al. |
| 2012/0150869 A1 | 6/2012 | Wang et al. |
| 2012/0150930 A1 | 6/2012 | Jin et al. |
| 2012/0151118 A1 | 6/2012 | Flynn et al. |
| 2012/0166715 A1 | 6/2012 | Frost et al. |
| 2012/0166749 A1 | 6/2012 | Eleftheriou et al. |
| 2012/0185437 A1 | 7/2012 | Pavlov et al. |
| 2012/0197844 A1 | 8/2012 | Wang et al. |
| 2012/0221828 A1 | 8/2012 | Fang et al. |
| 2012/0239869 A1 | 9/2012 | Chiueh et al. |
| 2012/0243687 A1 | 9/2012 | Li et al. |
| 2012/0246129 A1 | 9/2012 | Rothschild et al. |
| 2012/0246392 A1 | 9/2012 | Cheon |
| 2012/0290788 A1 | 11/2012 | Klemm et al. |
| 2012/0303876 A1 | 11/2012 | Benhase et al. |
| 2012/0310890 A1 | 12/2012 | Dodd et al. |
| 2012/0311246 A1 | 12/2012 | McWilliams et al. |
| 2012/0311290 A1 | 12/2012 | White |
| 2012/0317084 A1 | 12/2012 | Liu |
| 2012/0317338 A1 | 12/2012 | Yi et al. |
| 2012/0317353 A1 | 12/2012 | Webman et al. |
| 2012/0317395 A1 | 12/2012 | Segev et al. |
| 2012/0323860 A1 | 12/2012 | Yasa et al. |
| 2012/0324150 A1* | 12/2012 | Moshayedi ............ G06F 3/0619 711/103 |
| 2013/0007097 A1 | 1/2013 | Sambe et al. |
| 2013/0010966 A1 | 1/2013 | Li et al. |
| 2013/0013654 A1 | 1/2013 | Lacapra et al. |
| 2013/0018854 A1 | 1/2013 | Condict |
| 2013/0019057 A1 | 1/2013 | Stephens |
| 2013/0042065 A1 | 2/2013 | Kasten et al. |
| 2013/0060992 A1 | 3/2013 | Cho et al. |
| 2013/0073519 A1 | 3/2013 | Lewis et al. |
| 2013/0073821 A1 | 3/2013 | Flynn et al. |
| 2013/0080679 A1 | 3/2013 | Bert |
| 2013/0086006 A1 | 4/2013 | Colgrove et al. |
| 2013/0086270 A1 | 4/2013 | Nishikawa et al. |
| 2013/0110783 A1 | 5/2013 | Wertheimer et al. |
| 2013/0110845 A1 | 5/2013 | Dua |
| 2013/0124776 A1 | 5/2013 | Hallak et al. |
| 2013/0138616 A1 | 5/2013 | Gupta et al. |
| 2013/0138862 A1 | 5/2013 | Motwani et al. |
| 2013/0166724 A1 | 6/2013 | Bairavasundaram et al. |
| 2013/0166727 A1 | 6/2013 | Wright et al. |
| 2013/0166861 A1 | 6/2013 | Takano et al. |
| 2013/0185719 A1 | 7/2013 | Kar et al. |
| 2013/0219048 A1 | 8/2013 | Arvidsson et al. |
| 2013/0226877 A1 | 8/2013 | Nagai et al. |
| 2013/0227111 A1 | 8/2013 | Wright et al. |
| 2013/0227195 A1 | 8/2013 | Beaverson et al. |
| 2013/0227201 A1 | 8/2013 | Talagala et al. |
| 2013/0227236 A1 | 8/2013 | Flynn et al. |
| 2013/0232261 A1 | 9/2013 | Wright et al. |
| 2013/0238832 A1 | 9/2013 | Dronamraju et al. |
| 2013/0238876 A1 | 9/2013 | Fiske et al. |
| 2013/0238932 A1 | 9/2013 | Resch |
| 2013/0262805 A1 | 10/2013 | Zheng et al. |
| 2013/0268497 A1 | 10/2013 | Baldwin et al. |
| 2013/0275656 A1 | 10/2013 | Talagala et al. |
| 2013/0290263 A1 | 10/2013 | Beaverson et al. |
| 2013/0305002 A1 | 11/2013 | Hallak et al. |
| 2013/0311740 A1 | 11/2013 | Watanabe et al. |
| 2013/0332688 A1 | 12/2013 | Corbett et al. |
| 2013/0346700 A1 | 12/2013 | Tomlinson et al. |
| 2013/0346720 A1 | 12/2013 | Colgrove et al. |
| 2013/0346810 A1 | 12/2013 | Kimmel et al. |
| 2014/0006353 A1 | 1/2014 | Chen et al. |
| 2014/0013068 A1 | 1/2014 | Yamato et al. |
| 2014/0052764 A1 | 2/2014 | Michael et al. |
| 2014/0068184 A1 | 3/2014 | Edwards et al. |
| 2014/0082255 A1* | 3/2014 | Powell ................ G11B 33/144 711/102 |
| 2014/0082273 A1 | 3/2014 | Segev |
| 2014/0089683 A1 | 3/2014 | Miller et al. |
| 2014/0095758 A1 | 4/2014 | Smith et al. |
| 2014/0101115 A1 | 4/2014 | Ko et al. |
| 2014/0108350 A1 | 4/2014 | Marsden |
| 2014/0108797 A1 | 4/2014 | Johnson et al. |
| 2014/0149647 A1 | 5/2014 | Guo et al. |
| 2014/0172811 A1* | 6/2014 | Green ...................... H04L 67/06 707/705 |
| 2014/0181370 A1 | 6/2014 | Cohen et al. |
| 2014/0185615 A1 | 7/2014 | Ayoub et al. |
| 2014/0195480 A1 | 7/2014 | Talagala et al. |
| 2014/0195564 A1 | 7/2014 | Talagala et al. |
| 2014/0208003 A1 | 7/2014 | Cohen et al. |
| 2014/0215129 A1 | 7/2014 | Kuzmin et al. |
| 2014/0215170 A1 | 7/2014 | Scarpino et al. |
| 2014/0244962 A1 | 8/2014 | Arges et al. |
| 2014/0258681 A1 | 9/2014 | Prasky et al. |
| 2014/0279917 A1 | 9/2014 | Minh et al. |
| 2014/0279931 A1 | 9/2014 | Gupta et al. |
| 2014/0281055 A1 | 9/2014 | Davda et al. |
| 2014/0297980 A1 | 10/2014 | Yamazaki |
| 2014/0310231 A1 | 10/2014 | Sampathkumaran et al. |
| 2014/0310373 A1 | 10/2014 | Aviles et al. |
| 2014/0325117 A1 | 10/2014 | Canepa et al. |
| 2014/0325147 A1 | 10/2014 | Nayak |
| 2014/0344222 A1 | 11/2014 | Morris et al. |
| 2014/0379965 A1 | 12/2014 | Gole et al. |
| 2015/0019792 A1 | 1/2015 | Swanson et al. |
| 2015/0032928 A1* | 1/2015 | Andrews ............ G06F 13/4022 710/300 |
| 2015/0058577 A1* | 2/2015 | Earl ...................... G06F 3/0613 711/136 |
| 2015/0066852 A1 | 3/2015 | Beard et al. |
| 2015/0085665 A1 | 3/2015 | Kompella et al. |
| 2015/0085695 A1* | 3/2015 | Ryckbosch ............ H04L 43/04 370/253 |
| 2015/0089138 A1 | 3/2015 | Tao et al. |
| 2015/0095555 A1 | 4/2015 | Asnaashari et al. |
| 2015/0106556 A1 | 4/2015 | Yu et al. |
| 2015/0112939 A1 | 4/2015 | Cantwell et al. |
| 2015/0120754 A1 | 4/2015 | Chase et al. |
| 2015/0127922 A1* | 5/2015 | Camp ................ G06F 12/0246 711/206 |
| 2015/0134926 A1 | 5/2015 | Yang et al. |
| 2015/0143164 A1 | 5/2015 | Veerla et al. |
| 2015/0169414 A1 | 6/2015 | Lalsangi et al. |
| 2015/0172111 A1 | 6/2015 | Lalsangi et al. |
| 2015/0193338 A1 | 7/2015 | Sundaram et al. |
| 2015/0205663 A1 | 7/2015 | Sundaram et al. |
| 2015/0220402 A1 | 8/2015 | Cantwell et al. |
| 2015/0242478 A1 | 8/2015 | Cantwell et al. |
| 2015/0244795 A1 | 8/2015 | Cantwell et al. |
| 2015/0261446 A1* | 9/2015 | Lee ...................... G06F 13/385 711/103 |
| 2015/0286438 A1* | 10/2015 | Simionescu ........ G06F 12/0866 711/103 |
| 2015/0324264 A1 | 11/2015 | Chinnakkonda et al. |
| 2015/0339194 A1 | 11/2015 | Kalos et al. |

(56) References Cited

U.S. PATENT DOCUMENTS

| | | |
|---|---|---|
| 2015/0355985 A1 | 12/2015 | Holtz et al. |
| 2015/0378613 A1 | 12/2015 | Koseki |
| 2016/0070480 A1 | 3/2016 | Babu et al. |
| 2016/0070618 A1 | 3/2016 | Pundir et al. |
| 2016/0070644 A1 | 3/2016 | D'Sa et al. |
| 2016/0070714 A1 | 3/2016 | D'Sa et al. |
| 2016/0077744 A1 | 3/2016 | Pundir et al. |
| 2016/0139838 A1 | 5/2016 | D'Sa et al. |
| 2016/0179410 A1 | 6/2016 | Haas et al. |
| 2016/0248583 A1 | 8/2016 | McClanahan et al. |

FOREIGN PATENT DOCUMENTS

| | | |
|---|---|---|
| EP | 2693358 A1 | 2/2014 |
| EP | 2735978 A1 | 5/2014 |
| WO | WO-2006050455 A2 | 5/2006 |
| WO | WO-2012132943 A1 | 10/2012 |

OTHER PUBLICATIONS

Cornwell, Michael, "Anatomy of a Solid-state Drive," ACM Queue—Networks, vol. 10, No. 10, Oct. 2012, pp. 1-7.
Debnath, Biplob, et al., "FlashStore:.High Throughput Persistent Key-Value Store," Proceedings of the VLDB Endowment VLDB Endowment, vol. 3, Issue 1-2, Sep. 2010, pp. 1414-1425.
Gal, Eran et al., "Algorithms and Data Structures for Flash Memories," ACM Computing Surveys, vol. 37, No. 2, Jun. 2005, pp. 138-163.
Gray, Jim et al., "Flash Disk Opportunity for Server Applications," Queue—Enterprise Flash Storage, vol. 6, Issue 4, Jul.-Aug. 2008, pp. 18-23.
Handy, Jim, "SSSI Tech Notes: How Controllers Maximize SSD Life," SNIA, Jan. 2013, pp. 1-20.
Intel, Product Specification—Intel® Solid-State Drive DC S3700, Jun. 2013 (32 Pages).
Leventhal, Adam H. "A File System All Its Own," Communications of the ACM Queue, vol. 56, No. 5, May 2013, pp. 64-67.
Lim, H. et al., "SILT: A Memory-Efficient, High-Performance Key-Value Store," Proceedings of the $23^{rd}$ ACM Symposium on Operating Systems Principles (SOSP'11), Oct. 23-26, 2011, pp. 1-13.
Moshayedi, Mark, et al., "Enterprise SSDs," ACM Queue—Enterprise Flash Storage, vol. 6 No. 4, Jul.-Aug. 2008, pp. 32-39.
Rosenblum, Mendel, et al., "The Design and Implementation of a Log-Structured File System," Proceedings of the $13^{th}$ ACM Symposium on Operating Systems Principles, Jul. 24, 1991, pp. 1-15.
Rosenblum, Mendel, et al., "The LFS Storage Manager," Summer '90 USENIX Technical Conference, Anaheim, California, Jun. 1990, pp. 1-16.
Rosenblum, Mendel, "The Design and Implementation of a Log-structured File System," UC Berkeley, Thesis, 1992, pp. 1-101.
Seltzer, Margo, et al., "An Implementation of a Log Structured File System for UNIX," Winter USENIX, San Diego, CA, Jan. 25-29, 1993, pp. 1-18.
Seltzer, Margo, et al., "File System Performance and Transaction Support," UC Berkeley, Thesis, 1992, pp. 1-131.
Smith, Kent, "Garbage Collection," SandForce, Flash Memory Summit, Santa Clara, CA, Aug. 2011, pp. 1-9.
Texas Instruments, User Guide, TMS320C674x/OMAP-L1x Processor Serial ATA (SATA) Controller, Mar. 2011 (76 Pages).
Wu, Po-Liang, et al., "A File-System-Aware FTL Design for Flash-Memory Storage Systems," Design, Automation & Test in Europe Conference & Exhibition, IEEE, 2009, pp. 1-6.
Alvaraez C., "NetApp Deduplication for FAS and V-Series Deployment and Implementation Guide," Technical Report TR-3505, 2011, 71 pages.
Amit et al., "Strategies for Mitigating the IOTLB Bottleneck," Technion—Israel Institute of Technology, IBM Research Haifa, WIOSCA 2010—Sixth Annual Workshop on the Interaction between Operating Systems and Computer Architecture, 2010, 12 pages.
Arpaci-Dusseau R., et al., "Log-Structured File Systems," Operating Systems: Three Easy Pieces published by Arpaci-Dusseau Books, May 25, 2014, 15 pages.
Balakrishnan M., et al., "CORFU: A Shared Log Design for Flash Clusters," Microsoft Research Silicon Vally, University of California, San Diego, Apr. 2012, https://www.usenix.org/conference/nsdi12/technical-sessions/presentation/balakrishnan, 14 pages.
Ben-Yehuda et al., "The Price of Safety: Evaluating IOMMU Performance," Proceedings of the Linux Symposium, vol. 1, Jun. 27-30, 2007, pp. 9-20.
Bitton D. et al., "Duplicate Record Elimination in Large Data Files," Oct. 26, 1999, 11 pages.
Bogaerdt, "cdeftutorial," http://oss.oetiker.ch/rrdtool/tut/cdeftutorial.en.html Date obtained from the internet, Sep. 9, 2014, 14 pages.
Bogaerdt, "Rates, Normalizing and Consolidating," http://www.vandenbogaerdl.nl/rrdtool/process.php Date obtained from the internet: Sep. 9, 2014, 5 pages.
Bogaerdt, "rrdtutorial," http://oss.oetiker.ch/rrdtool/lul/rrdtutorial.en.html Date obtained from the internet, Sep. 9, 2014, 21 pages.
Chris K., et al., "How many primes are there?" Nov. 2001. https://web.archive.org/web/20011120073053/http://primes.utm.edu/howmany.shtml.
Culik K., et al., "Dense Multiway Trees," ACM Transactions on Database Systems, Sep. 1981, vol. 6 (3), pp. 486-512.
Debnath, et al., "ChunkStash: Speeding up in line Storage Deduplication using Flash Memory," USENIX, USENIXATC '10, Jun. 2010, 15 pages.
Fan, et al., "MemC3: Compact and Concurrent MemCache with Dumber Caching and Smarter Hashing," USENIX NSDI '13, Apr. 2013, pp. 371-384.
Final Office Action mailed Dec. 2, 2015, for U.S. Appl. No. 14/684,956, filed Apr. 13, 2015, 12 pages.
Final Office Action mailed Dec. 22, 2015, for U.S. Appl. No. 13/857,008, filed Apr. 4, 2013, 10 pages.
Final Office Action mailed Dec. 4, 2013, for U.S. Appl. No. 13/856,997, filed Apr. 4, 2013, 25 pages.
Final Office Action mailed Dec. 4, 2015, for U.S. Appl. No. 14/454,197, filed Aug. 7, 2014, 11 pages.
Final Office Action mailed Feb. 16, 2016, for U.S. Appl. No. 14/186,847, filed Feb. 21, 2014, 25 pages.
Final Office Action mailed Feb. 2, 2016, for U.S. Appl. No. 13/856,958, filed Apr. 4, 2013, 18 pages.
Final Office Action mailed Feb. 6, 2014, for U.S. Appl. No. 13/856,958, filed Apr. 4, 2013, 16 pages.
Final Office Action mailed Mar. 2, 2016 for U.S. Appl. No. 14/701,832, filed May 1, 2015, 16 pages.
Final Office Action mailed May 13, 2013, for U.S. Appl. No. 13/041,122, filed Mar. 4, 2011, 22 pages.
Final Office Action mailed Nov. 25, 2015, for U.S. Appl. No. 14/684,966, filed Apr. 13, 2015, 21 pages.
Gulati et al., "BASIL: Automated IO Load Balancing Across Storage Devices," Proceedings of the 8th USENIX Conference on File and Storage Technologies, FAST'10, Berkeley, CA, USA, 2010, 14 pages.
Hwang K., et al., "RAID-x: A New Distributed Disk Array for I/O-centric Cluster Computing," IEEE High-Performance Distributed Computing, Aug. 2000, pp. 279-286.
International Search Report and Written Opinion for Application No. PCT/EP2014/071446 mailed on Apr. 1, 2015, 14 pages.
International Search Report and Written Opinion for Application No. PCT/US2012/071844 mailed Mar. 1, 2013, 12 pages.
International Search Report and Written Opinion for Application No. PCT/US2014/035284 mailed on Apr. 1, 2015, 8 pages.
International Search Report and Written Opinion for Application No. PCT/US2014/055138 mailed on Dec. 12, 2014, 13 pages.
International Search Report and Written Opinion for Application No. PCT/US2014/058728 mailed on Dec. 16, 2014, 11 pages.
International Search Report and Written Opinion for Application No. PCT/US2014/060031 mailed on Jan. 26, 2015, 9 pages.

(56) References Cited

OTHER PUBLICATIONS

International Search Report and Written Opinion for Application No. PCT/US2014/071446 mailed on Apr. 1, 2015, 13 pages.
International Search Report and Written Opinion for Application No. PCT/US2014/071465 mailed on Mar. 25, 2015, 12 pages.
International Search Report and Written Opinion for Application No. PCT/US2014/071484 mailed on Mar. 25, 2015, 9 pages.
International Search Report and Written Opinion for Application No. PCT/US2014/071581 mailed on Apr. 10, 2015, 9 pages.
International Search Report and Written Opinion for Application No. PCT/US2014/071635 mailed on Mar. 31, 2015, 13 pages.
International Search Report and Written Opinion for Application No. PCT/US2015/016625 mailed on Sep. 17, 2015, 8 pages.
International Search Report and Written Opinion for Application No. PCT/US2015/021285 mailed Jun. 23, 2015, 8 pages.
International Search Report and Written Opinion for Application No. PCT/US2015/024067 mailed Jul. 8, 2015, 7 pages.
International Search Report and Written Opinion for Application No. PCT/US2015/048800 mailed on Nov. 25, 2015, 11 pages.
International Search Report and Written Opinion for Application No. PCT/US2015/048833 mailed on Nov. 25, 2015, 11 pages.
International Search Report and Written Opinion for Application No. PCT/US2015/056932 mailed on Jan. 21, 2016, 11 pages.
International Search Report and Written Opinion for Application No. PCT/US2015/057532 mailed on Feb. 9, 2016, 12 pages.
Kagel A.S, "two-way merge sort," Dictionary of Algorithms and Data Structures [online], retrieved on Jan. 28, 2015, Retrieved from the Internet :< URL: http://xlinux.nist.gov/dads/HTMUIwowaymrgsrl.html>, May 2005, 1 page.
Lamport L., "The Part-Time Parliament," ACM Transactions on Computer Systems, May 1998, vol. 16 (2), pp. 133-169.
Metreveli et al. "CPHash: A Cache-Partitioned Hash Table." Nov. 2011. https://people.csail.mit.edu/nickolai/papers/metrevelicphash-tr.pdf.
Non-Final Office Action mailed Aug. 12, 2015, for U.S. Appl. No. 14/684,929, filed Apr. 13, 2015, 20 pages.
Non-Final Office Action mailed Aug. 13, 2015, for U.S. Appl. No. 13/856,958, filed Apr. 4, 2013, 15 pages.
Non-Final Office Action mailed Aug. 13, 2015, for U.S. Appl. No. 14/186,847, filed Feb. 21, 2014, 20 pages.
Non-Final Office Action mailed Aug. 21, 2013, for U.S. Appl. No. 13/856,997, filed Apr. 4, 2013, 19 pages.
Non-Final Office Action mailed Aug. 7, 2015, for U.S. Appl. No. 14/684,894, filed Apr. 13, 2015, 10 pages.
Non-Final Office Action mailed Dec. 5, 2012, for U.S. Appl. No. 13/041,122, filed Mar. 4, 2011, 21 pages.
Non-Final Office Action mailed Jan. 29, 2016, for U.S. Appl. No. 14/454,197, filed Aug. 7, 2014, 11 pages.
Non-Final Office Action mailed Jul. 1, 2015, for U.S. Appl. No. 13/857,008, filed Apr. 4, 2013, 10 pages.
Non-Final Office Action mailed Jul. 14, 2015, for U.S. Appl. No. 14/454,197, filed Aug. 7, 2014, 5 pages.
Non-Final Office Action mailed Jul. 14, 2015, for U.S. Appl. No. 14/684,956, filed Apr. 13, 2015, 5 pages.
Non-Final Office Action mailed Jul. 14, 2015, for U.S. Appl. No. 14/684,966, filed Apr. 13, 2015, 21 pages.
Non-Final Office Action mailed Jul. 29, 2015, for U.S. Appl. No. 14/292,089, filed May 30, 2014, 4 pages.
Non-Final Office Action mailed Jul. 31, 2013, for U.S. Appl. No. 13/856,958, filed Apr. 4, 2013, 15 pages.
Non-Final Office Action mailed Jul. 31, 2015 for U.S. Appl. No. 14/259,467, filed Apr. 23, 2014, 10 pages.
Non-Final Office Action mailed Jul. 31, 2015, for U.S. Appl. No. 14/684,942, filed Apr. 13, 2015, 4 pages.
Non-Final Office Action mailed Jun. 17, 2013, for U.S. Appl. No. 13/041,095, filed Mar. 4, 2011, 10 pages.
Non-Final Office Action mailed Jun. 30, 2015, for U.S. Appl. No. 14/057,145, filed Oct. 18, 2015, 21 pages.
Non-Final Office Action mailed Mar. 31, 2016, for U.S. Appl. No. 14/941,938.

Non-Final Office Action mailed Oct. 19, 2015, for U.S. Appl. No. 14/701,832, filed May 1, 2015, 11 pages.
Non-Final Office Action mailed on Jan. 26, 2016 for U.S. Appl. No. 14/932,063, filed Nov. 4, 2015, 9 pages.
Non-Final Office Action mailed Sep. 10, 2014, for U.S. Appl. No. 13/338,039, filed Dec. 27, 2011, 10 pages.
Notice Allowance mailed Jan. 21, 2016, for U.S. Appl. No. 14/684,894, filed Apr. 13, 2015, 13 pages.
Notice of Allowance mailed Apr. 14, 2015, for U.S. Appl. No. 13/856,997, filed Apr. 4, 2013, 18 pages.
Notice of Allowance mailed Apr. 24, 2014, for U.S. Appl. No. 13/041,122, filed Mar. 4, 2011, 14 pages.
Notice of Allowance mailed Aug. 24, 2016, for U.S. Appl. No. 14/684,956, filed Apr. 13, 2015, 4 pages.
Notice of Allowance mailed Aug. 27, 2015 for U.S. Appl. No. 14/684,914, filed Apr. 13, 2015, 10 pages.
Notice of Allowance mailed Dec. 8, 2014, for U.S. Appl. No. 13/338,039, filed Dec. 27, 2011, 7 pages.
Notice of Allowance mailed Feb. 22, 2016, for U.S. Appl. No. 14/057,145, filed Oct. 18, 2015, 12 pages.
Notice of Allowance mailed Mar. 29, 2016, for U.S. Appl. No. 14/454,197, filed Aug. 7, 2014, 7 pages.
Notice of Allowance mailed May 4, 2016 for U.S. Appl. No. 14/932,063, filed Nov. 4, 2015, 7 pages.
Notice of Allowance mailed Oct. 9, 2013, for U.S. Appl. No. 13/041,095, filed Mar. 4, 2011, 7 pages.
Oetiker, "rrdfetch," http ://oss.oetiker.ch/rrdtool/doc/rrdfetch .en.html, Date obtained from the internet: Sep. 9, 2014, 5 pages.
Oetiker, "rrdtool," http ://loss. oetiker.ch/rrdtool/doc/rrdtool.en. html Date obtained from the internet: Sep. 9, 2014, 5 pages.
O'Neil P., at al., "The Log-structured Merge-tree (lsm-tree)," Acta Informatica, 33, 1996, pp. 351-385.
Ongaro D., et al., "In Search of an Understandable Consensus Algorithm," Stanford University, URL: https://ramcloud.stanford.edu/wiki/download/attachments/11370504/raft.pdf, May 2013, 14 pages.
Ongaro, et al., "In search of an understandable consensus algorithm (extended version)," 2014, 18 pages.
Pagh R., et al., "Cuckoo Hashing," Elsevier Science, Dec. 8, 2003, pp. 1-27.
Pagh R., et al., "Cuckoo Hashing for Undergraduates," IT University of Copenhagen, Mar. 27, 2006, pp. 1-6.
Proceedings of the FAST 2002 Conference on File Storage Technologies, Monterey, California, USA, Jan. 28-30, 2002, 14 pages.
Rosenblum M., et al., "The Design and Implementation of a Log-Structured File System," In Proceedings of ACM Transactions on Computer Systems, vol. 10(1),Feb. 1992, pp. 26-52.
Rosenblum M., et al., "The Design and Implementation of a Log-Structured File System," Proceedings of the 13th ACM Symposium on Operating Systems Principles, (SUN00007382-SUN00007396), Jul. 1991, 15 pages.
Rosenblum M., et al., "The LFS Storage Manager," USENIX Technical Conference, Computer Science Division, Electrical Engin. and Computer Sciences, Anaheim, CA, presented at Summer '90 USENIX Technical Conference, (SUN00006851-SUN00006866), Jun. 1990, 16 pages.
Sears., et al., "Blsm: A General Purpose Log Structured Merge Tree," Proceedings of the 2012 ACM SIGMOD International Conference on Management, 2012, 12 pages.
Stoica et al. "Chord: A Scalable Peer-to-peer Lookup Service for Internet Applications." Aug. 2001. ACM. SOGCOMM '01.
Supplementary European Search Report for Application No. EP12863372 mailed on Jul. 16, 2015, 7 pages.
Twigg A., et al., "Stratified B-trees and Versioned Dictionaries," Proceedings of the 3rd US EN IX Conference on Hot Topics in Storage and File Systems, 2011, vol. 11, pp. 1-5.
Wikipedia, "Cuckoo hashing," http://en.wikipedia.org/wiki/Cuckoo_hash, Apr. 2013, pp. 1-5.
Wilkes J., et al., "The Hp Auto Raid Hierarchical Storage System," Operating System Review, ACM, New York, NY, Dec. 1, 1995, vol. 29 (5), pp. 96-108.

* cited by examiner

LOAD BALANCING TECHNIQUE FOR A STORAGE ARRAY

BACKGROUND

Technical Field

The present disclosure relates to storage systems and, more specifically, to load balancing of input/output (I/O) workloads in a storage system.

Background Information

A storage system typically includes one or more storage devices, such as disks embodied as hard disk drives (HDDs), into which data may be entered, and from which data may be obtained, as desired. The storage system may implement a high-level module, such as a file system, to logically organize the data stored on the disks as storage containers, such as files or logical units (LUNs). The storage system typically includes a front-end module to receive requests from a host that form a workload. The system may also include a load balancer at the front-end to distribute the workload among the storage containers. However, previous load balancers are generally directed to varying workloads without regard as to the type of storage media, e.g., solid state drives (SSDs) such as flash storage devices, whose characteristics may differ significantly from HDDs. Typically, optimal I/O sizes and I/O patterns of various workloads differ substantially between, e.g., HDDs and SSDs. Further, such previous load balancers are also employed for data migration (already stored data) between storage containers. In sum, the previous load balancers are focused on host requests received at the front-end of the storage system, rather than optimizing I/O workloads to back-end storage devices.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

Embodiments described herein are directed to a technique for load balancing using heuristic-based algorithms with respect to input/output (I/O) latency of workloads destined to storage devices, e.g., solid state drives (SSDs) such as flash storage devices, of a storage array attached to a storage system. Illustratively, "front-end" requests received from a host result in a back-end workload as those requests are processed by a storage I/O stack of the storage system and stored on the storage array. Accordingly, the technique maintains a consistent latency for the host requests (front-end) to thereby control latency for the back-end workload.

In an embodiment, the load balancing technique illustratively load balances fixed (back-end) workloads having similar I/O sizes and I/O patterns. The technique may be used for segment cleaning within a storage array, but may not be optimal for data migration among different storage arrays. The workload may be embodied as I/O requests that are processed by the storage I/O stack and stored on the storage array of SSDs. Illustratively, the technique balances the workload across a plurality of (4) storage (SAS) ports over one or more I/O paths to the SSDs, which are organized as disks shelves that are shared among the SAS ports. Access to the SSDs may then be distributed among the storage ports.

In an embodiment, there are multiple (e.g., at least 4) I/O paths to any SSD of the storage array. The load balancing technique ensures that none of these I/O paths are overused (no hot spots) to thereby ensure predictable (i.e., consistent) latency of I/O requests (front-end) processed by the storage I/O stack. The technique achieves such predictable latency by dynamically load balancing back-end I/O (read and write) requests of the workload over the storage ports (e.g., SAS links) to the SSDs to avoid hot spots. To that end, counters may be employed on the storage ports to measure I/O sizes, I/O latency (times), and to collect errors. The heuristic-based algorithms may be employed to measure utilization of the SAS links and ports, as well as destinations of the back-end I/O requests (i.e., destination SSD and LBA range of the request) to determine optimal I/O paths (e.g., storage and interface controllers, SAS ports and links) over which the requests may traverse. Further, specific characteristics of flash devices are also considered in tuning and preparing the SSDs of the storage array.

Unlike previous load balancers that are focused on host requests received at a front-end of the storage system, the load balancing technique described herein is focused on I/O requests received at a back-end of the storage system (i.e., the storage I/O stack). By dynamically load balancing on the back-end of the stack, the technique ensures continuous delivery of high IOPs (I/O operations per second) and predictable (low) latency.

DESCRIPTION

Storage Cluster

Figure 1:
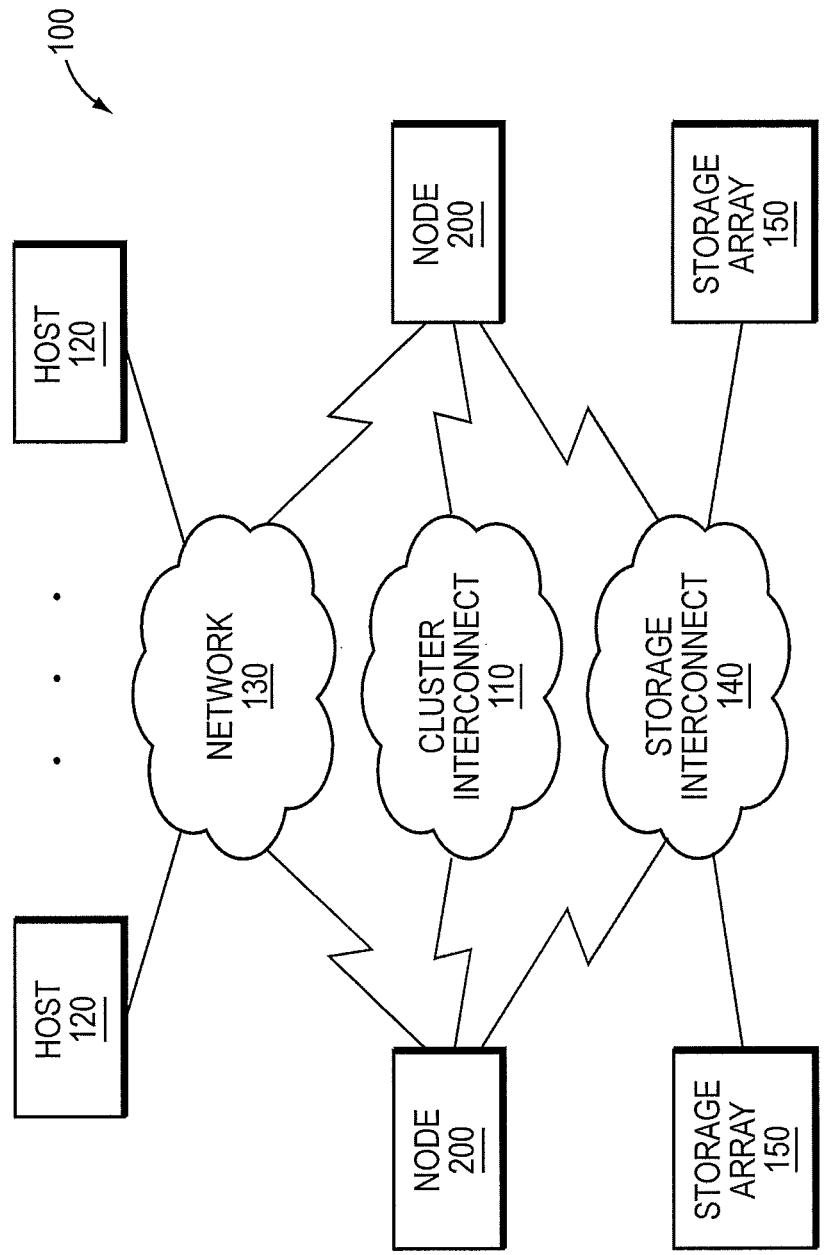
FIG. 1 is a block diagram of a plurality of nodes interconnected as a cluster.

FIG. 1 is a block diagram of a plurality of nodes 200 interconnected as a cluster 100 and configured to provide storage service relating to the organization of information on storage devices. The nodes 200 may be interconnected by a cluster interconnect fabric 110 and include functional components that cooperate to provide a distributed storage architecture of the cluster 100, which may be deployed in a storage area network (SAN). As described herein, the components of each node 200 include hardware and software functionality that enable the node to connect to one or more hosts 120 over a computer network 130, as well as to one or more storage arrays 150 of storage devices over a storage interconnect 140, to thereby render the storage service in accordance with the distributed storage architecture.

Each host 120 may be embodied as a general-purpose computer configured to interact with any node 200 in accordance with a client/server model of information delivery. That is, the client (host) may request the services of the node, and the node may return the results of the services requested by the host, by exchanging packets over the network 130. The host may issue packets including file-based access protocols, such as the Network File System (NFS) protocol over the Transmission Control Protocol/Internet Protocol (TCP/IP), when accessing information on the node in the form of storage containers such as files and directories. However, in an embodiment, the host 120 illustratively issues packets including block-based access protocols, such as the Small Computer Systems Interface (SCSI) protocol encapsulated over TCP (iSCSI) and SCSI encapsulated over FC (FCP), when accessing information in the form of storage containers such as logical units (LUNs). Notably, any of the nodes 200 may service a request directed to a storage container stored on the cluster 100.

Figure 2:
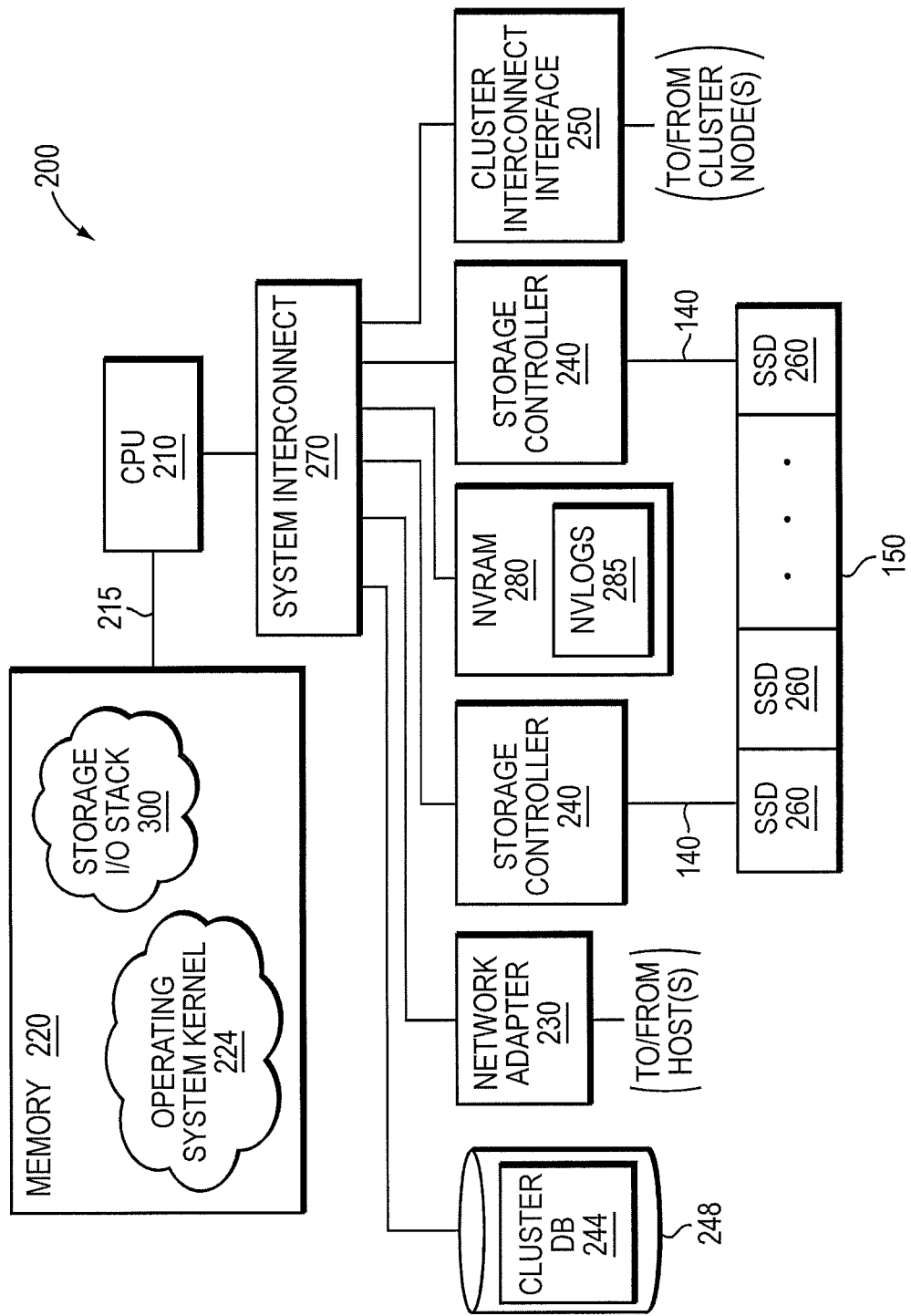
FIG. 2 is a block diagram of a node.

FIG. 2 is a block diagram of a node 200 that is illustratively embodied as a storage system having one or more central processing units (CPUs) 210 coupled to a memory 220 via a memory bus 215. The CPU 210 is also coupled to a network adapter 230, storage controllers 240, a cluster interconnect interface 250 and a non-volatile random access memory (NVRAM 280) via a system interconnect 270. The network adapter 230 may include one or more ports adapted to couple the node 200 to the host(s) 120 over computer network 130, which may include point-to-point links, wide area networks, virtual private networks implemented over a public network (Internet) or a local area network. The network adapter 230 thus includes the mechanical, electrical and signaling circuitry needed to connect the node to the network 130, which illustratively embodies an Ethernet or Fibre Channel (FC) network.

The memory 220 may include memory locations that are addressable by the CPU 210 for storing software programs and data structures associated with the embodiments described herein. The CPU 210 may, in turn, include processing elements and/or logic circuitry configured to execute the software programs, such as a storage input/output (I/O) stack 300, and manipulate the data structures. Illustratively, the storage I/O stack 300 may be implemented as a set of user mode processes that may be decomposed into a plurality of threads. An operating system kernel 224, portions of which are typically resident in memory 220 (in-core) and executed by the processing elements (i.e., CPU 210), functionally organizes the node by, inter alia, invoking operations in support of the storage service implemented by the node and, in particular, the storage I/O stack 300. A suitable operating system kernel 224 may include a general-purpose operating system, such as the UNIX® series or Microsoft Windows® series of operating systems, or an operating system with configurable functionality such as microkernels and embedded kernels. However, in an embodiment described herein, the operating system kernel is illustratively the Linux® operating system. It will be apparent to those skilled in the art that other processing and memory means, including various computer readable media, may be used to store and execute program instructions pertaining to the embodiments herein.

Each storage controller 240 cooperates with the storage I/O stack 300 executing on the node 200 to access information requested by the host 120. The information is preferably stored on storage devices such as solid state drives (SSDs) 260, illustratively embodied as flash storage devices, of storage array 150. In an embodiment, the flash storage devices may be based on NAND flash components, e.g., single-layer-cell (SLC) flash, multi-layer-cell (MLC) flash or triple-layer-cell (TLC) flash, although it will be understood to those skilled in the art that other non-volatile, solid-state electronic devices (e.g., drives based on storage class memory components) may be advantageously used with the embodiments described herein. Accordingly, the storage devices may or may not be block-oriented (i.e., accessed as blocks). The storage controller 240 includes one or more ports having I/O interface circuitry that couples to the SSDs 260 over the storage interconnect 140, illustratively embodied as a serial attached SCSI (SAS) topology. Alternatively, other point-to-point I/O interconnect arrangements, such as a conventional serial ATA (SATA) topology or a PCI topology, may be used. The system interconnect 270 may also couple the node 200 to a local service storage device 248, such as an SSD configured to locally store cluster-related configuration information, e.g., as cluster database (DB) 244, which may be replicated to other nodes 200 in the cluster 100.

The cluster interconnect interface 250 may include one or more ports adapted to couple the node 200 to the other node(s) of the cluster 100. In an embodiment, Ethernet may be used as the clustering protocol and interconnect fabric media, although it will be apparent to those skilled in the art that other types of protocols and interconnects, such as Infiniband, may be utilized within the embodiments described herein. The NVRAM 280 may include a back-up battery or other built-in last-state retention capability (e.g., non-volatile semiconductor memory such as storage class memory) that is capable of maintaining data in light of a failure to the node and cluster environment. Illustratively, a portion of the NVRAM 280 may be configured as one or more non-volatile logs (NVLogs 285) configured to temporarily record ("log") I/O requests, such as write requests, received from the host 120.

Storage I/O Stack

Figure 3:
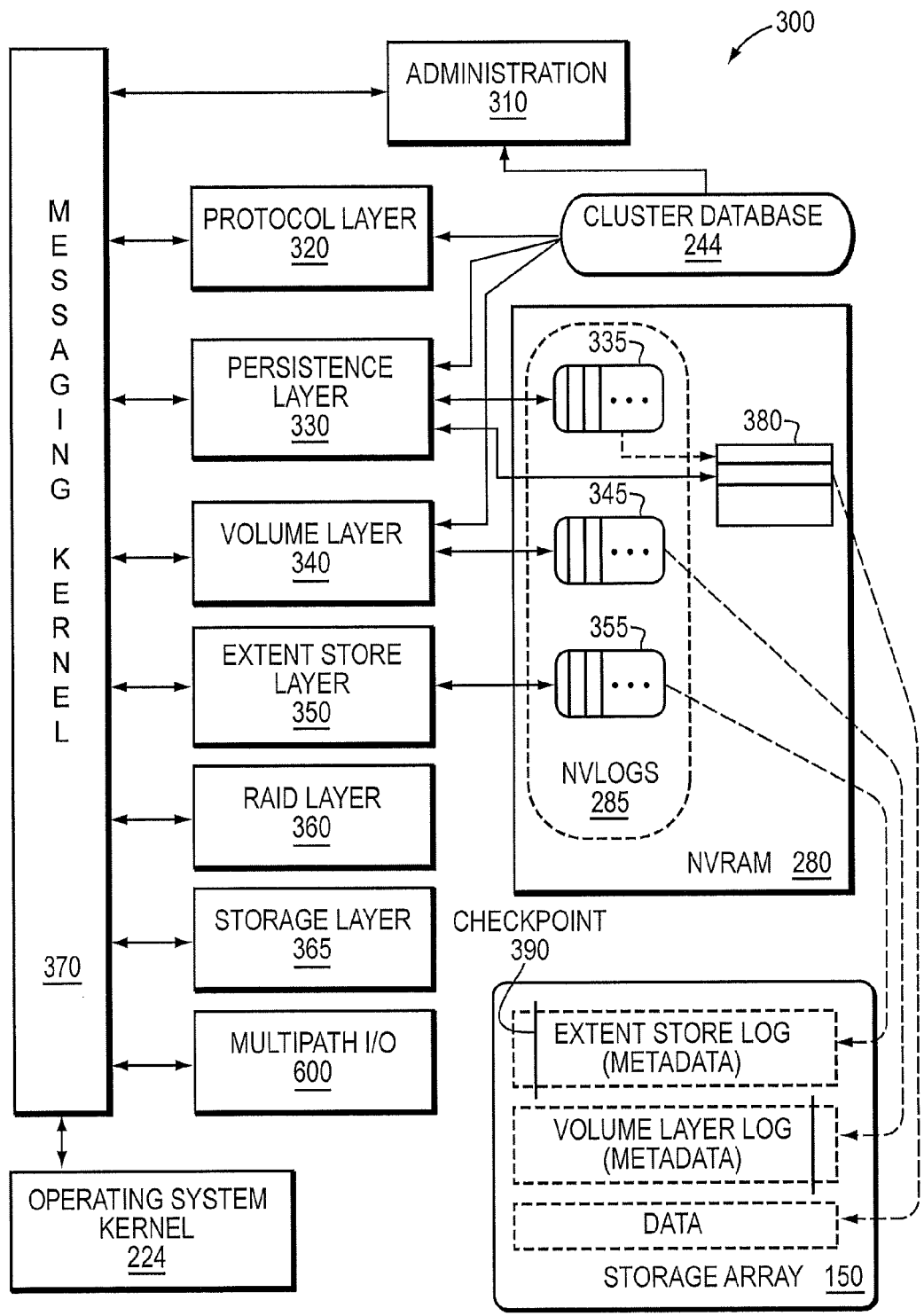
FIG. 3 is a block diagram of a storage input/output (I/O) stack of the node.

FIG. 3 is a block diagram of the storage I/O stack 300 that may be advantageously used with one or more embodiments described herein. The storage I/O stack 300 includes a plurality of software modules or layers that cooperate with other functional components of the nodes 200 to provide the distributed storage architecture of the cluster 100. In an embodiment, the distributed storage architecture presents an abstraction of a single storage container, i.e., all of the storage arrays 150 of the nodes 200 for the entire cluster 100 organized as one large pool of storage. In other words, the architecture consolidates storage, i.e., the SSDs 260 of the arrays 150, throughout the cluster (retrievable via cluster-wide keys) to enable storage of the LUNs. Both storage capacity and performance may then be subsequently scaled by adding nodes 200 to the cluster 100.

Illustratively, the storage I/O stack 300 includes an administration layer 310, a protocol layer 320, a persistence layer 330, a volume layer 340, an extent store layer 350, a Redundant Array of Independent Disks (RAID) layer 360, a storage layer 365 and a NVRAM (storing NVLogs) "layer" interconnected with a messaging kernel 370. The messaging kernel 370 may provide a message-based (or event-based) scheduling model (e.g., asynchronous scheduling) that employs messages as fundamental units of work exchanged (i.e., passed) among the layers. Suitable message-passing mechanisms provided by the messaging kernel to transfer information between the layers of the storage I/O stack 300 may include, e.g., for intra-node communication: i) messages that execute on a pool of threads, ii) messages that execute on a single thread progressing as an operation through the storage I/O stack, iii) messages using an Inter Process Communication (IPC) mechanism, and e.g., for inter-node communication: messages using a Remote Procedure Call (RPC) mechanism in accordance with a function shipping implementation. Alternatively, the storage I/O stack 300 may be implemented using a thread-based or stack-based execution model without messages. In one or more embodiments, the messaging kernel 370 allocates processing resources from the operating system kernel 224 to execute the messages. Each storage I/O stack layer may be implemented as one or more instances (i.e., processes) executing one or more threads (e.g., in kernel or user space) that process the messages passed between the layers such that the messages provide synchronization for blocking and non-blocking operation of the layers.

In an embodiment, the protocol layer 320 may communicate with the host 120 over the network 130 by exchanging discrete frames or packets configured as I/O requests according to pre-defined protocols, such as iSCSI and FCP. An I/O request, e.g., a read or write request, may be directed to a LUN and may include I/O parameters such as, inter alia, a LUN identifier (ID), a logical block address (LBA) of the LUN, a length (i.e., amount of data) and, in the case of a write request, write data. The protocol layer 320 receives the I/O request and forwards it to the persistence layer 330, which records the request into a persistent write-back cache 380, illustratively embodied as a log whose contents can be replaced randomly, e.g., under some random access replacement policy rather than only in serial fashion, and returns an acknowledgement to the host 120 via the protocol layer 320. In one or more embodiments, only I/O requests that modify the LUN, e.g., write requests, are logged. Notably, the I/O request may be logged at the node receiving the I/O request, or in an alternative embodiment in accordance with the function shipping implementation, the I/O request may be logged at another node.

Illustratively, dedicated logs may be maintained by the various layers of the storage I/O stack 300. For example, a dedicated log 335 may be maintained by the persistence layer 330 to record the I/O parameters of an I/O request as equivalent internal, i.e., storage I/O stack, parameters, e.g., volume ID, offset, and length. In the case of a write request, the persistence layer 330 may also cooperate with the NVRAM 280 to implement the write-back cache 380 configured to store the write data associated with the write request. In an embodiment, the write-back cache may be structured as a log. Notably, the write data for the write request may be physically stored in the cache 380 such that the log 335 contains the reference to the associated write data. It will be understood to persons skilled in the art that other variations of data structures may be used to store or maintain the write data in NVRAM including data structures with no logs. In an embodiment, a copy of the write-back cache may also be maintained in the memory 220 to facilitate direct memory access to the storage controllers. In other embodiments, caching may be performed at the host 120 or at a receiving node in accordance with a protocol that maintains coherency between the write data stored at the cache and the cluster.

In an embodiment, the administration layer 310 may apportion the LUN into multiple volumes, each of which may be partitioned into multiple regions (e.g., allotted as disjoint block address ranges), with each region having one or more segments stored as multiple stripes on the array 150. A plurality of volumes distributed among the nodes 200 may thus service a single LUN, i.e., each volume within the LUN services a different LBA range (i.e., offset and length, hereinafter offset range) or set of ranges within the LUN. The protocol layer 320 may implement a volume mapping technique to identify a volume to which the I/O request is directed (i.e., the volume servicing the offset range indicated by the parameters of the I/O request). Illustratively, the cluster database 244 may be configured to maintain one or more associations (e.g., key-value pairs) for each of the multiple volumes, e.g., an association between the LUN ID and a volume, as well as an association between the volume and a node ID for a node managing the volume. The administration layer 310 may also cooperate with the database 244 to create (or delete) one or more volumes associated with the LUN (e.g., creating a volume ID/LUN key-value pair in the database 244). Using the LUN ID and LBA (or LBA range), the volume mapping technique may provide a volume ID (e.g., using appropriate associations in the cluster database 244) that identifies the volume and node servicing the volume destined for the request, as well as translate the LBA (or LBA range) into an offset and length within the volume. Specifically, the volume ID is used to determine a volume layer instance that manages volume metadata associated with the LBA or LBA range. As noted, the protocol layer 320 may pass the I/O request (i.e., volume ID, offset and length) to the persistence layer 330, which may use the function shipping (e.g., inter-node) implementation to forward the I/O request to the appropriate volume layer instance executing on a node in the cluster based on the volume ID.

In an embodiment, the volume layer 340 may manage the volume metadata by, e.g., maintaining states of host-visible containers, such as ranges of LUNs, and performing data management functions, such as creation of snapshots and clones, for the LUNs in cooperation with the administration layer 310. The volume metadata is illustratively embodied as in-core mappings from LUN addresses (i.e., LBAs) to durable extent keys, which are unique cluster-wide IDs associated with SSD storage locations for extents within an extent key space of the cluster-wide storage container. That is, an extent key may be used to retrieve the data of the extent at an SSD storage location associated with the extent key. Alternatively, there may be multiple storage containers in the cluster wherein each container has its own extent key space, e.g., where the administration layer 310 provides distribution of extents among the storage containers. Illustratively, an extent is a variable length block of data that provides a unit of storage on the SSDs that need not be aligned on any specific boundary, i.e., it may be byte aligned. Accordingly, an extent may be an aggregation of write data from a plurality of write requests to maintain such alignment. Illustratively, the volume layer 340 may record the forwarded request (e.g., information or parameters characterizing the request), as well as changes to the volume metadata, in dedicated log 345 maintained by the volume layer. Subsequently, the contents of the volume layer log 345 may be written to the storage array 150 in accordance with retirement of log entries, while a checkpoint (e.g., synchronization) operation that stores in-core metadata on the array 150. That is, the checkpoint operation (checkpoint) ensures that a consistent state of metadata, as processed in-core, is committed to (i.e., stored on) the storage array 150; whereas the retirement of log entries ensures that the entries accumulated in the volume layer log 345 synchronize with the metadata checkpoints committed to the storage array 150 by, e.g., retiring those accumulated log entries that are prior to the checkpoint. In one or more embodiments, the checkpoint and retirement of log entries may be data driven, periodic or both.

In an embodiment, the extent store layer 350 is responsible for storing extents on the SSDs 260 (i.e., on the storage array 150) and for providing the extent keys to the volume layer 340 (e.g., in response to a forwarded write request). The extent store layer 350 is also responsible for retrieving data (e.g., an existing extent) using an extent key (e.g., in response to a forwarded read request). The extent store layer 350 may be responsible for performing de-duplication and compression on the extents prior to storage. The extent store layer 350 may maintain in-core mappings (e.g., embodied as hash tables) of extent keys to SSD storage locations (e.g., offset on an SSD 260 of array 150). The extent store layer 350 may also maintain a dedicated log 355 of entries that accumulate requested "put" and "delete" operations (i.e., write requests and delete requests for extents issued from other layers to the extent store layer 350), where these operations change the in-core mappings (i.e., hash table entries). Subsequently, the in-core mappings and contents of the extent store layer log 355 may be written to the storage array 150 in accordance with a "fuzzy" checkpoint 390 (i.e., checkpoints with incremental changes recorded in one or more log files) in which selected in-core mappings, less than the total, are committed to the array 150 at various intervals (e.g., driven by an amount of change to the in-core mappings, size thresholds of log 355, or periodically). Notably, the accumulated entries in log 355 may be retired once all in-core mappings have been committed to include the changes recorded in those entries.

In an embodiment, the RAID layer 360 may organize the SSDs 260 within the storage array 150 as one or more RAID groups (e.g., sets of SSDs) that enhance the reliability and integrity of extent storage on the array by writing data "stripes" having redundant information, i.e., appropriate parity information with respect to the striped data, across a given number of SSDs 260 of each RAID group. The RAID layer 360 may also store a number of stripes (e.g., stripes of sufficient depth), e.g., in accordance with a plurality of contiguous range write operations, so as to reduce data relocation (i.e., internal flash block management) that may occur within the SSDs as a result of the operations. In an embodiment, the storage layer 365 implements storage I/O drivers that may communicate directly with hardware (e.g., the storage controllers 240 and cluster interface 250) cooperating with the operating system kernel 224, such as a Linux virtual function I/O (VFIO) driver. The storage I/O stack 300 may also include a multi-path I/O (MPIO) layer 600 for load balancing I/O latencies of workloads destined to the SSDs 260, as described further herein.

Write Path

Figure 4:
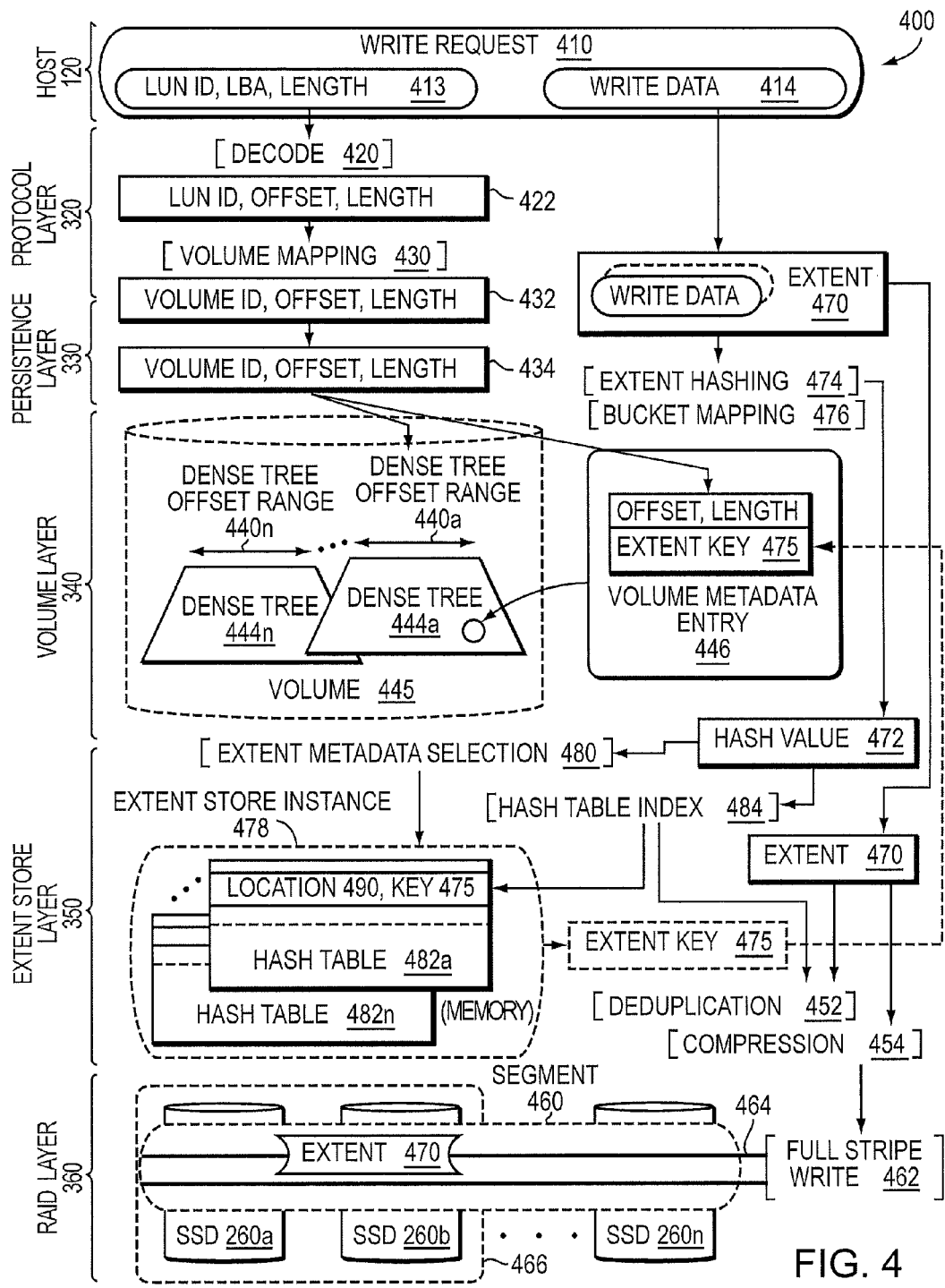
FIG. 4 illustrates a write path of the storage I/O stack.

FIG. 4 illustrates an I/O (e.g., write) path 400 of the storage I/O stack 300 for processing an I/O request, e.g., a SCSI write request 410. The write request 410 may be issued by host 120 and directed to a LUN stored on the storage array 150 of the cluster 100. Illustratively, the protocol layer 320 receives and processes the write request by decoding 420 (e.g., parsing and extracting) fields of the request, e.g., LUN ID, LBA and length (shown at 413), as well as write data 414. The protocol layer 320 may use the results 422 from decoding 420 for a volume mapping technique 430 (described above) that translates the LUN ID and LBA range (i.e., equivalent offset and length) of the write request to an appropriate volume layer instance, i.e., volume ID (volume 445), in the cluster 100 that is responsible for managing volume metadata for the LBA range. In an alternative embodiment, the persistence layer 330 may implement the above-described volume mapping technique 430. The protocol layer then passes the results 432, e.g., volume ID, offset, length (as well as write data), to the persistence layer 330, which records the request in the persistence layer log 335 and returns an acknowledgement to the host 120 via the protocol layer 320. The persistence layer 330 may aggregate and organize write data 414 from one or more write requests into a new extent 470 and perform a hash computation, i.e., a hash function, on the new extent to generate a hash value 472 in accordance with an extent hashing technique 474.

The persistence layer 330 may then pass the write request with aggregated write data including, e.g., the volume ID, offset and length, as parameters 434 to the appropriate volume layer instance. In an embodiment, message passing of the parameters 432 (received by the persistence layer) may be redirected to another node via the function shipping mechanism, e.g., RPC, for inter-node communication. Alternatively, message passing of the parameters 434 may be via the IPC mechanism, e.g., message threads, for intra-node communication.

In one or more embodiments, a bucket mapping technique 476 is provided that translates the hash value 472 to an instance of an appropriate extent store layer (e.g., extent store instance 478) that is responsible for storing the new extent 470. Note, the bucket mapping technique may be implemented in any layer of the storage I/O stack 300 above the extent store layer 350. In an embodiment, for example, the bucket mapping technique may be implemented in the persistence layer 330, the volume layer 340, or a layer that manages cluster-wide information, such as a cluster layer (not shown). The persistence layer 330 may then pass the hash value 472 and the new extent 470 to the appropriate volume layer instance and onto the appropriate extent store instance via an extent store put operation. The extent hashing technique 474 may embody an approximately uniform hash function to ensure that any random extent to be written may have an approximately equal chance of falling into any extent store instance 478, i.e., hash buckets are distributed across extent store instances of the cluster 100 based on available resources. As a result, the bucket mapping technique 476 provides load balancing of write operations (and, by symmetry, read operations) across nodes 200 of the cluster, while also leveling flash wear in the SSDs 260 of the cluster.

In response to the put operation, the extent store instance may process the hash value 472 to perform an extent metadata selection technique 480 that (i) selects an appropriate hash table 482 (e.g., hash table 482a) from a set of hash tables (illustratively in-core) within the extent store instance 478, and (ii) extracts a hash table index 484 from the hash value 472 to index into the selected hash table and lookup a table entry having an extent key 475 identifying a storage location 490 on SSD 260 for the extent. Accordingly, the extent store layer 350 may contain computer executable instructions executed by the CPU 210 to perform operations that implement the metadata selection technique 480 described herein. If a table entry with a matching key is found, the SSD location 490 mapped from the extent key 475 is used to retrieve an existing extent (not shown) from SSD. The existing extent is then compared with the new extent 470 to determine whether their data is identical. If the data is identical, the new extent 470 is already stored on SSD 260 and a de-duplication opportunity (denoted de-duplication 452) exists such that there is no need to write another copy of the data. Accordingly, a reference count (not shown) in the table entry for the existing extent is incremented and the extent key 475 of the existing extent is passed to the appropriate volume layer instance for storage within an entry (denoted as volume metadata entry 446) of a dense tree metadata structure (e.g., dense tree 444a), such that the extent key 475 is associated an offset range (e.g., offset range 440a) of the volume 445.

However, if the data of the existing extent is not identical to the data of the new extent 470, a collision occurs and a deterministic algorithm is invoked to sequentially generate as many new candidate extent keys (not shown) mapping to the same bucket as needed to either provide de-duplication 452 or produce an extent key that is not already stored within the extent store instance. Notably, another hash table (e.g. hash table 482n) of extent store instance 478 may be selected by a new candidate extent key in accordance with the extent metadata selection technique 480. In the event that no de-duplication opportunity exists (i.e., the extent is not already stored) the new extent 470 is compressed in accordance with compression technique 454 and passed to the RAID layer 360, which processes the new extent 470 for storage on SSD 260 within one or more stripes 464 of RAID group 466. The extent store instance may cooperate with the RAID layer 360 to identify a storage segment 460 (i.e., a portion of the storage array 150) and a location on SSD 260 within the segment 460 in which to store the new extent 470. Illustratively, the identified storage segment is a segment with a large contiguous free space having, e.g., location 490 on SSD 260b for storing the extent 470.

In an embodiment, the RAID layer 360 then writes the stripes 464 across the RAID group 466, illustratively as a full write stripe 462. The RAID layer 360 may write a series of stripes 464 of sufficient depth to reduce data relocation that may occur within flash-based SSDs 260 (i.e., flash block management). The extent store instance then (i) loads the SSD location 490 of the new extent 470 into the selected hash table 482n (i.e., as selected by the new candidate extent key), (ii) passes a new extent key (denoted as extent key 475) to the appropriate volume layer instance for storage within an entry (also denoted as volume metadata entry 446) of a dense tree 444 managed by that volume layer instance, and (iii) records a change to metadata of the selected hash table in the extent store layer log 355. Illustratively, the volume layer instance selects dense tree 444a spanning an offset range 440a of the volume 445 that encompasses the offset range of the write request. As noted, the volume 445 (e.g., an offset space of the volume) is partitioned into multiple regions (e.g., allotted as disjoint offset ranges); in an embodiment, each region is represented by a dense tree 444. The volume layer instance then inserts the volume metadata entry 446 into the dense tree 444a and records a change corresponding to the volume metadata entry in the volume layer log 345. Accordingly, the I/O (write) request is sufficiently stored on SSD 260 of the cluster.

Read Path

Figure 5:
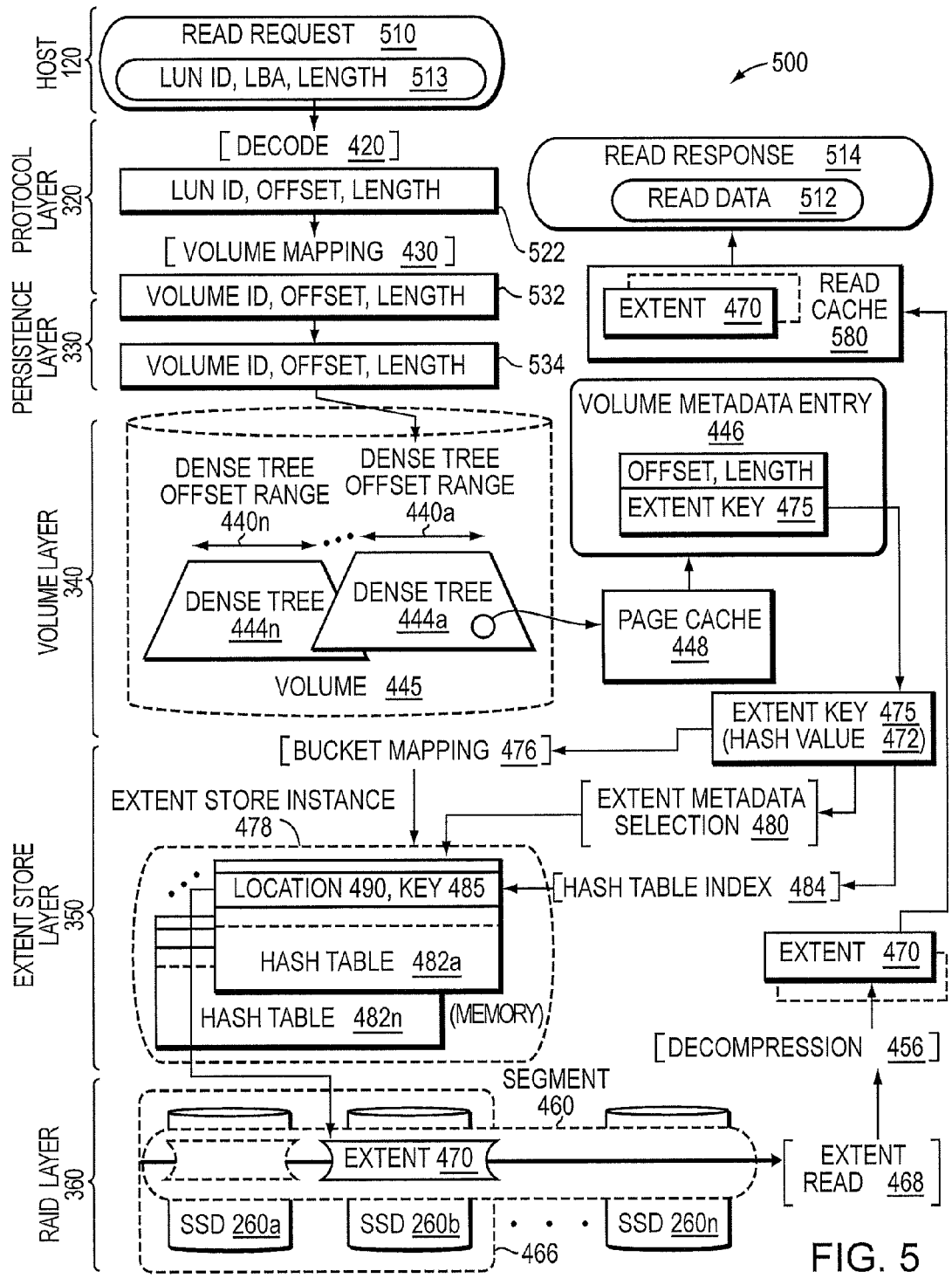
FIG. 5 illustrates a read path of the storage I/O stack.

FIG. 5 illustrates an I/O (e.g., read) path 500 of the storage I/O stack 300 for processing an I/O request, e.g., a SCSI read request 510. The read request 510 may be issued by host 120 and received at the protocol layer 320 of a node 200 in the cluster 100. Illustratively, the protocol layer 320 processes the read request by decoding 420 (e.g., parsing and extracting) fields of the request, e.g., LUN ID, LBA, and length (shown at 513), and uses the results 522, e.g., LUN ID, offset, and length, for the volume mapping technique. That is, the protocol layer 320 may implement the volume mapping technique 430 (described above) to translate the LUN ID and LBA range (i.e., equivalent offset and length) of the read request to an appropriate volume layer instance, i.e., volume ID (volume 445), in the cluster 100 that is responsible for managing volume metadata for the LBA (i.e., offset) range. The protocol layer then passes the results 532 to the persistence layer 330, which may search the write-back cache 380 to determine whether some or all of the read request can be serviced from its cached data. If the entire request cannot be serviced from the cached data, the persistence layer 330 may then pass the remaining portion of the request including, e.g., the volume ID, offset and length, as parameters 534 to the appropriate volume layer instance in accordance with the function shipping mechanism (e.g., RPC, for inter-node communication) or the IPC mechanism (e.g., message threads, for intra-node communication).

The volume layer instance may process the read request to access a dense tree metadata structure (e.g., dense tree 444a) associated with a region (e.g., offset range 440a) of a volume 445 that encompasses the requested offset range (specified by parameters 534). The volume layer instance may further process the read request to search for (lookup) one or more volume metadata entries 446 of the dense tree 444a to obtain one or more extent keys 475 associated with one or more extents 470 within the requested offset range. Illustratively, each dense tree 444 may be embodied as multiple levels of a search structure with possibly overlapping offset range entries at each level. The entries, i.e., volume metadata entries 446, provide mappings from host-accessible LUN addresses, i.e., LBAs (offsets), to durable extent keys. The various levels of the dense tree may have volume metadata entries 446 for the same offset, in which case the higher level has the newer entry and is used to service the read request. A top level of the dense tree 444 is illustratively resident in-core and a page cache 448 may be used to access lower levels of the tree. If the requested range or portion thereof is not present in the top level, a metadata page associated with an index entry at the next lower tree level is accessed. The metadata page (i.e., in the page cache 448) at the next level is then searched (e.g., a binary search) to find any overlapping entries. This process is then iterated until one or more volume metadata entries 446 of a level are found to ensure that the extent key(s) 475 for the entire requested read range are found. If no metadata entries exist for the entire or portions of the requested read range, then the missing portion(s) are zero filled.

Once found, each extent key 475 is processed by the volume layer 340 to, e.g., implement the bucket mapping technique 476 that translates the extent key to an appropriate extent store instance 478 responsible for storing the requested extent 470. Note that, in an embodiment, each extent key 475 may be substantially identical to the hash value 472 associated with the extent 470, i.e., the hash value as calculated during the write request for the extent, such that the bucket mapping 476 and extent metadata selection 480 techniques may be used for both write and read path operations. Note also that the extent key 475 may be derived from the hash value 472. The volume layer 340 may then pass the extent key 475 (i.e., the hash value from a previous write request for the extent) to the appropriate extent store instance 478 (via an extent store get operation), which performs an extent key-to-SSD mapping to determine the location on SSD 260 for the extent.

In response to the get operation, the extent store instance may process the extent key 475 (i.e., the hash value 472) to perform the extent metadata selection technique 480 that (i) selects an appropriate hash table (e.g., hash table 482a) from a set of hash tables within the extent store instance 478, and (ii) extracts a hash table index 484 from the extent key 475 (i.e., the hash value 472) to index into the selected hash table and lookup a table entry having a matching extent key 475 that identifies a storage location 490 on SSD 260 for the extent 470. That is, the SSD location 490 mapped to the extent key 475 may be used to retrieve the existing extent (denoted as extent 470) from SSD 260 (e.g., SSD 260b). The extent store instance then cooperates with the RAID layer 360 to access the extent on SSD 260b and retrieve the data contents in accordance with the read request. Illustratively, the RAID layer 360 may read the extent in accordance with an extent read operation 468 and pass the extent 470 to the extent store instance. The extent store instance may then decompress the extent 470 in accordance with a decompression technique 456, although it will be understood to those skilled in the art that decompression can be performed at any layer of the storage I/O stack 300. The extent 470 may be stored in a buffer (not shown) in memory 220 and a reference to that buffer may be passed back through the layers of the storage I/O stack. The persistence layer may then load the extent into a read cache 580 (or other staging mechanism) and may extract appropriate read data 512 from the read cache 580 for the LBA range of the read request 510. Thereafter, the protocol layer 320 may create a SCSI read response 514, including the read data 512, and return the read response to the host 120.

Layered File System

The embodiments described herein illustratively employ a layered file system of the storage I/O stack. The layered file system includes a flash-optimized, log-structured layer (i.e., extent store layer) of the file system configured to provide sequential storage of data and metadata (i.e., log-structured layout) on the SSDs 260 of the cluster. The data may be organized as an arbitrary number of variable-length extents of one or more host-visible LUNs served by the nodes. The metadata may include mappings from host-visible logical block address ranges (i.e., offset ranges) of a LUN to extent keys, as well as mappings of the extent keys to SSD storage locations of the extents. Illustratively, the volume layer of the layered file system cooperates with the extent store layer to provide a level of indirection that facilitates efficient log-structured layout of extents on the SSDs by the extent store layer.

In an embodiment, functions of the log-structured layer of the file system, such as write allocation and flash device (i.e., SSD) management, are performed and maintained by the extent store layer 350. Write allocation may include gathering of the variable-length extents to form full stripes that may be written to free segments across SSDs of one or more RAID groups, whereas flash device management may include segment cleaning to create such free segments that indirectly map to the SSDs. Instead of relying on garbage collection in the SSDs, the storage I/O stack may implement segment cleaning (i.e., garbage collection) in the extent store layer to bypass performance impacts of flash translation layer (FTL) functionality (including garbage collection) in the SSD. In other words, the storage I/O stack allows the log-structured layer of the file system to operate as a data layout engine using segment cleaning to effectively replace the FTL functionality of the SSD. The extent store layer may thus process random write requests in accordance with segment cleaning (i.e., garbage collection) to predict flash behavior within its FTL functionality. As a result, a log-structured equivalent source of write amplification for the storage I/O stack may be consolidated and managed at the extent store layer. In addition, the log-structured layer of the file system may be employed, in part, to improve write performance from the flash devices of the storage array.

Load Balancing I/O

Embodiments described herein are directed to a technique for load balancing using heuristic-based algorithms with respect to I/O latency of workloads destined to storage devices, e.g., SSDs 260, of the storage array 150 attached to the node 200. Illustratively, "front-end" host requests (e.g., write request 410 and read request 510) result in a backend workload as the front-end requests are processed by the storage I/O stack 300 and stored on the storage array 150. Accordingly, the technique maintains a consistent latency for front-end host requests to thereby control latency for the back-end workload.

The load balancing technique illustratively load balances fixed (back-end) workloads having similar I/O sizes and I/O patterns. The technique may be used for segment cleaning within a storage array, but may not be optimal for data migration among different storage arrays (i.e., different extent store instances). Illustratively, the technique balances the workload across a plurality of (4) storage (SAS) ports over one or more I/O path to the SSDs, which are organized as disks shelves that are shared among the SAS ports. Note that the workload may include I/O requests (back-end) that have both metadata (e.g., volume layer metadata entry 446) and data (e.g., write data 414).

Figure 6:
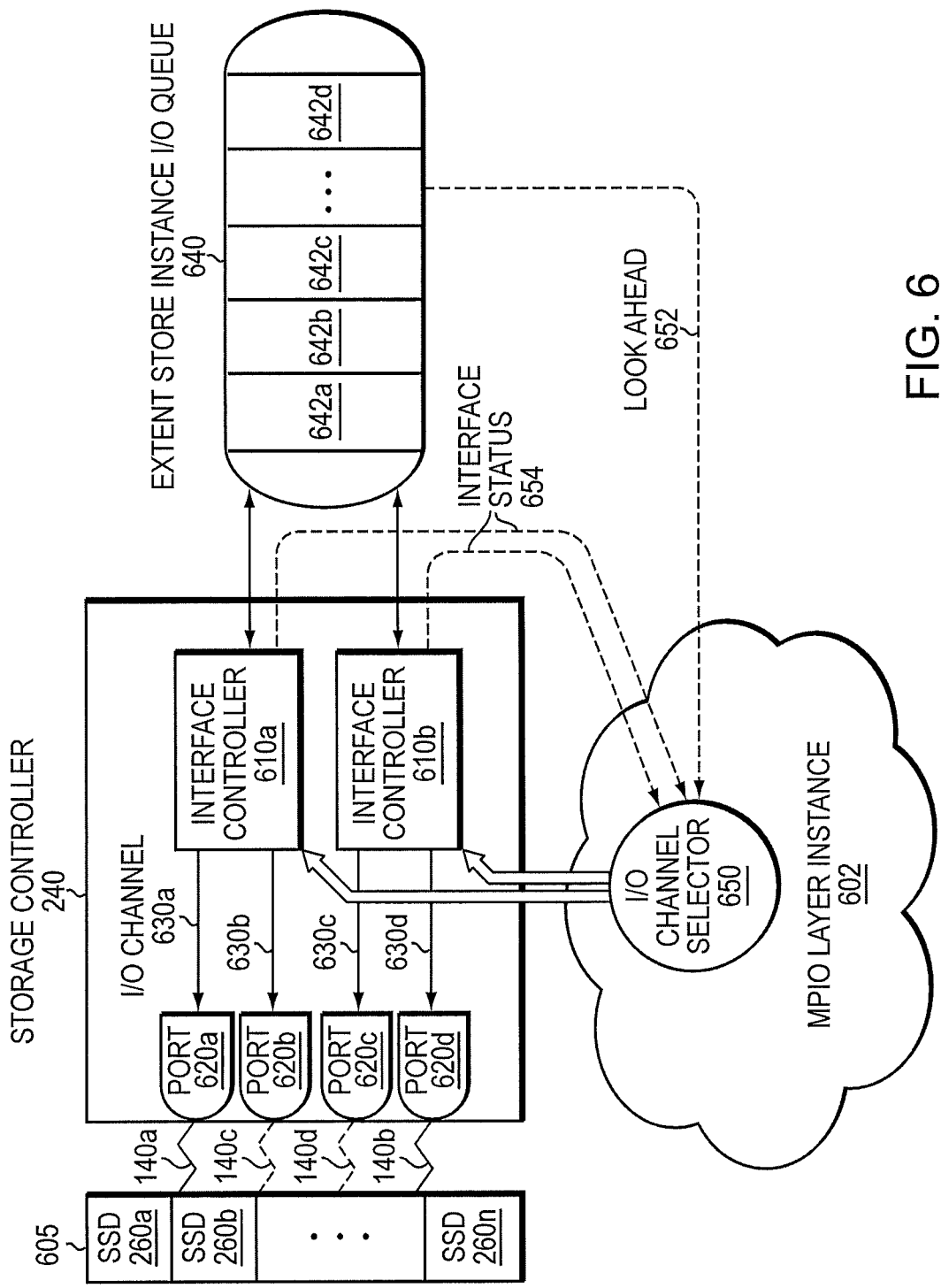
FIG. 6 is a block diagram of an I/O workload load balancing technique.

FIG. 6 is a block diagram of a I/O workload load balancing technique. Illustratively, a MPIO layer instance 602 of the MPIO layer 600 controls the path of the I/O work through the storage interconnect 140 via storage ports on the storage controllers 240. In an embodiment, the storage array 150 includes one or more disk shelves 605 having a plurality of, e.g., 24 SSDs, per disk shelf. An extent store instance I/O queue 640 may include I/O requests 642*a-d* (e.g., put and get operations to/from the extent store instance) that are passed to the disk shelves via the storage controllers 240, each of which is illustratively embodied as host a bus adapter (HBA). In turn, each HBA storage controller may include two interface controllers 610*a,b*, each of which may be connected to and control two storage (SAS) ports 620*a,b* and 620*c,d*, respectively. Thus, an I/O request 642 may traverse (pass through) an I/O path 140*a-d* over one of the four ports to any SSD 260*a-n*. Note that the load balancing technique may be extended to operate with any number of ports, such as eight ports on any number of storage controllers. Note also that persons of skill in the art will understand that various topologies may be used within the storage interconnect 140, such as SAS expanders, to form the one or more of the paths 140*a-d*.

Load balancing of I/O requests across the SAS ports 620*a-d* may be statically configured by, e.g., assigning an approximately equal number of SSDs to each of the ports. In an embodiment, the assignment of ports (i.e., primary ports) to SSDs may be dynamically configured and, thus, may be dynamically altered in response to e.g., load on a port, or failure of a port or controller. Illustratively, the MPIO layer instance 602 may include an I/O channel selector 650 to dynamically select the port (thus the I/O path 140*a-d*) for each I/O request 642. The I/O channel selector 650 may use feedback, such as interface status 654 (e.g., load on a port and failure of a port), from the interface controllers 610. The I/O channel selector may also employ look ahead 652 in the I/O queue 640 to predict how busy an I/O path may become. Note that the I/O paths for read requests (workloads) may vary from I/O paths of write workloads, in light of inline de-duplication operations that may be performed by the extent store layer 350 of the storage I/O stack 300. That is, an extent store put operation, embodied as an I/O request 642, may be de-duplicated and thus not stored in the storage array 150. Accordingly, the I/O request 642 is not sent to the storage controllers 240. Further, before any data is de-duplicated, the data may be read from SSD to determine if it is identical; if so, no write operation of the data is necessary and the data is de-duplicated. As a result, I/O read paths (i.e., storage interconnect paths 140*a-d*) may be more unpredictable than I/O write paths. Moreover, actual throughput to the interface controllers 610 may include unexpected reads and fewer writes due to de-duplication.

In an embodiment, the load balancing technique may predict utilization of a storage controller 240, interface controller 610, or port (link) 620, and dynamically direct an incoming workload to another storage controller, interface controller, or port based on the type of workload (e.g., fixed I/O size and I/O pattern). The technique essentially implements a control system using counters and I/O queues as feedback (e.g., look ahead 652) to determine an I/O path over which to route I/O requests. Illustratively, the counters, queues and algorithms may cooperate to provide a feedback loop configured to route I/O requests 642 (operations) through multi-channel I/O paths 630a-d to storage devices based on predictive incoming workloads. That is, the incoming workload (e.g., I/O queue 640) may provide "hints" as to the expected I/O operations (e.g., put and get operations embodied as I/O requests 642a-n). The counters may be used to measure the utilization of the various I/O paths. A read/write incoming workload ratio, where the latency associated with each type of I/O request (workload) is generally known, may also be used to vary the requests per I/O path. For example, a de-duplication operation may allow increased I/O throughput on the path (since no write operation is necessary).

In response to an I/O request received at the I/O queue 640, the load balancing technique may examine the depth of the queue, e.g., to determine whether there may be congestion or backup of requests pending in the queue. If the queue depth increases, a determination may be rendered as to the cause of the increase. For example, if an interface controller is the cause of the congestion, that controller may be reset or replaced. In an embodiment, a plurality of processor cores may be employed to process the I/O queue to obviate congestion within the queue and to maintain predictable latency. Illustratively, processing of the I/O queue involves removing I/O requests from the queue and sending the requests over an I/O path through a storage controller and onto the SSD. In addition, the processor cores may process completions of the I/O requests to obviate the use of interrupts and to enable higher processing throughput. Notably, processor cores may be dedicated to the storage controllers and configured to poll for completions as they occur.

Figure 7:
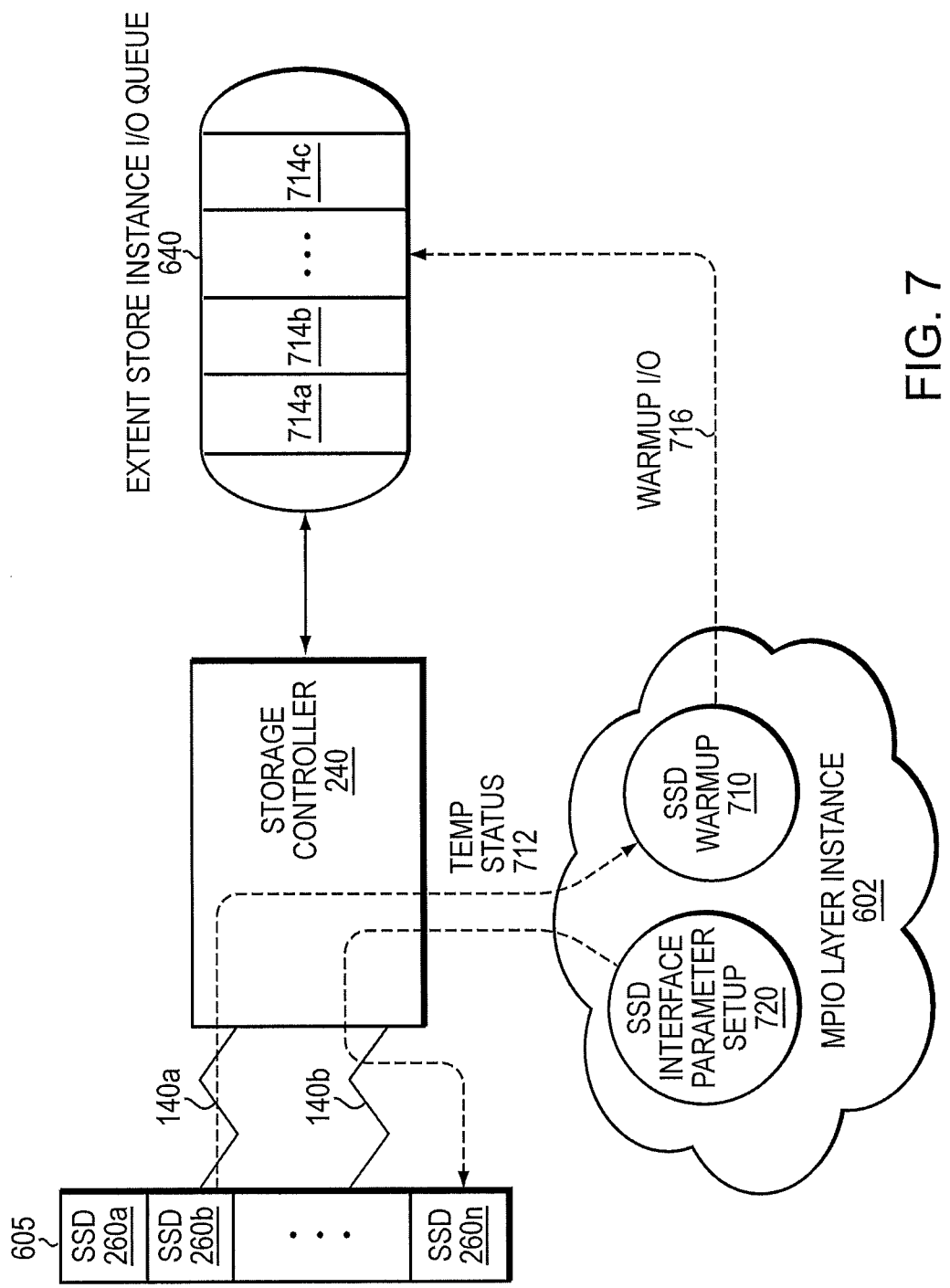
FIG. 7 is a block diagram of storage device preparation according to the load balancing technique.

FIG. 7 is a block diagram of storage device preparation according to the load balancing technique. In an embodiment, the SSDs may be prepared ("tweaked") to run optimally. According to the technique, a "warmup" phase conditions the SSDs to operate efficiently by, e.g., issuing I/O operations to exercise the SSDs and measure their temperatures. Illustratively, an SSD warmup module 710 obtains a temperature status 712 of an SSD 260 by querying the SSD and issues a warmup I/O signal 716 to the I/O queue 640. In response to the signal, the I/O queue 640 forwards one or more warmup I/O requests 714 to the SSD to raise the temperature of the SSD to a recommended operating temperature range. The SSD may also be configured (setup) by an SSD interface parameter setup module 720 that adjusts, e.g., SATA protocol parameters of the SSD. Before issuing an I/O operation, the SSD is "opened"; thereafter data is sent to the SSD and the SSD is "closed". This sequence illustratively occurs at a transport layer of a storage (SATA) protocol. The technique herein adjusts the default open time to an optimal setting (e.g., by reducing the time the SSD is open) to allow additional I/O operations per unit of time (increase I/O throughput to the SSDs).

Figure 8:
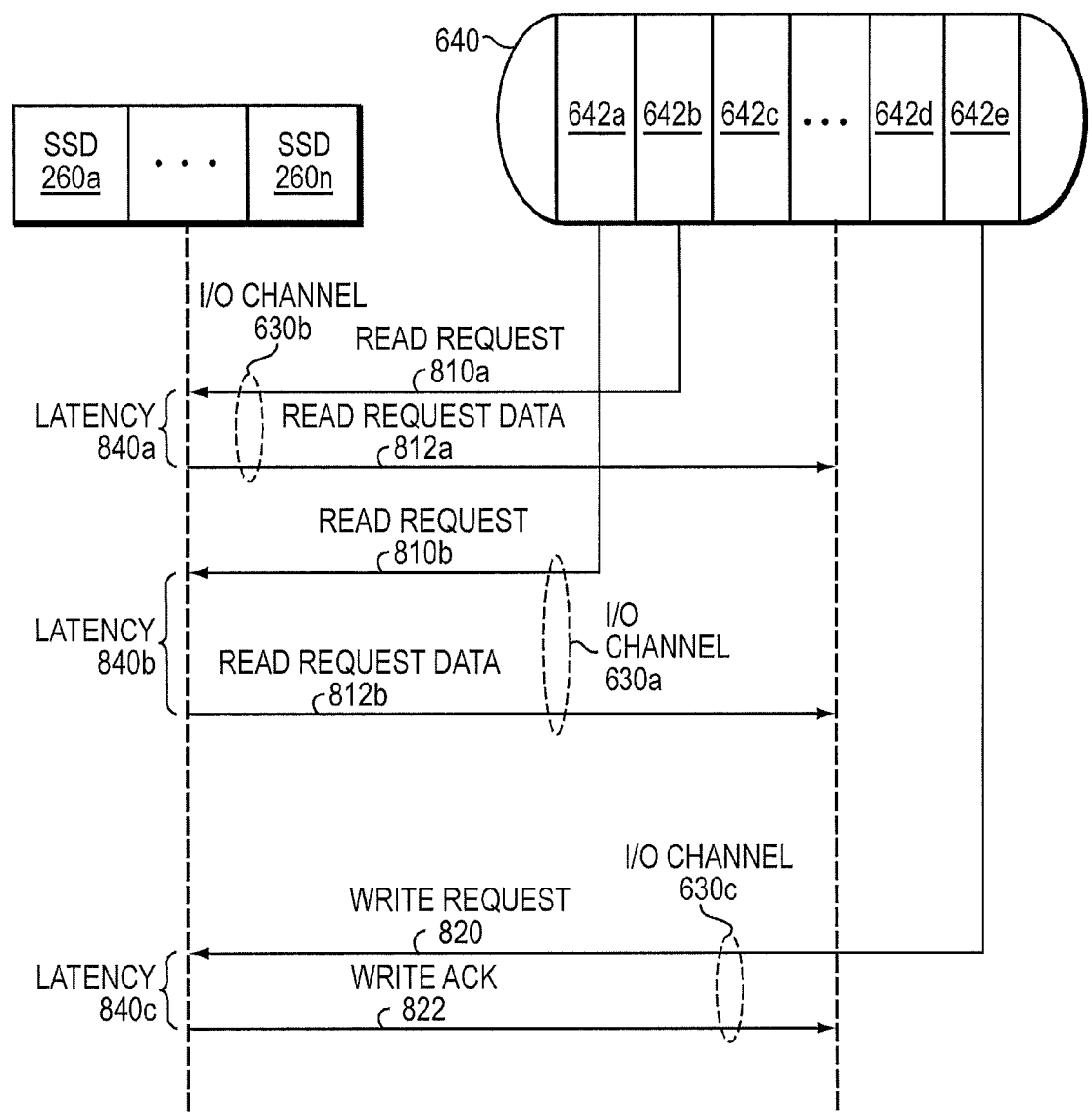
FIG. 8 is a sequence diagram illustrating varying latencies for different I/O channels.

FIG. 8 is a sequence diagram illustrating varying latencies for different I/O channels. An I/O request 642b in the I/O queue 640 may be processed to yield an I/O read request 810a sent over I/O channel 630b. A latency 840a for the I/O channel may be measured between sending the I/O read request 810a to one or more SSDs 260 and receiving read request data 812a. In an embodiment, latencies may vary according to the I/O request 642a-e and the I/O channel over which the I/O request is sent, e.g., latency 840b for earlier I/O read request 642a (i.e., get operation) may be greater than latency 840c for subsequent I/O write request 642e (i.e., put operation) sent via different I/O channel 630c. Accordingly, the load balancing technique smooths transient perturbations to the I/O latency (or rate of IOPs) that may occur from I/O-to-I/O by waiting a period of time (e.g., 60 to 120 seconds) before taking action (e.g., changing the primary port designation). In other words, the technique does not react immediately to temporary delays (i.e., disruptions) within the I/O path.

For example, assume that there are 24 SSDs on a shelf of the storage array and 6 SSDs are assigned to each (primary port) of the 4 storage ports. Now assume I/O operations are directed to a primary port and its 6 SSDs when a perturbation arises, resulting in failure of the primary port. After expiration of the period of time, each of the remaining 3 ports may be dynamically re-assigned as a primary port for 8 SSDs. Alternatively, if the perturbation is not a "hard" failure but rather a "soft" transient failure (i.e., perturbation), the primary port may be dynamically re-assigned as the primary port for 6 different SSDs. Moreover, if the perturbation is directed to one or more failed SSDs (instead of the ports), the ports may be configured to redirect the I/O operations destined for those failed SSDs to other SSDs of the array.

In an embodiment, the load balancing technique may balance I/O requests only across primary paths, wherein the secondary paths are reserved for failover (i.e., active-passive load balancing). That is, in response to a failure within the storage controller (e.g., interface controller 610a), the failed interface controller may be replaced or reset. During the time the failed controller is inoperable, the workload may be redistributed to the remaining interface controller 610b and its ports (620c, d). Alternatively, the load balancing technique may balance I/O requests across both primary and secondary paths (i.e., active-active load balancing), in which the workload is distributed across the interface controllers and their ports.

Referring to FIG. 6, the storage interconnect 140 may be embodied as a shared SAS bus such that any of the ports 620a-n may access any of the SSDs 260a-n at any point in time with only one port communicating with any one SSD. According to the technique, a port is initially designated as a primary port to access one or more SSDs with the remaining ports designated as backup ports for those SSDs. The technique may subsequently change the initial designation to dynamically select another port to be the primary port for the one or more SSDs with the remaining ports being backups. The algorithm used to dynamically select the primary/backup ports may be extended to examine characteristics of the SSDs, e.g., temperature, IOPs (I/O operations per second), I/O latency, etc. In addition, if one or more SSDs or ports are removed from the system, the technique compensates for the removal to ensure proper operation of the storage array by, e.g., invoking the load balancer (I/O channel selector 650) to redirect the I/O workload among remaining SSDs.

Figure 9:
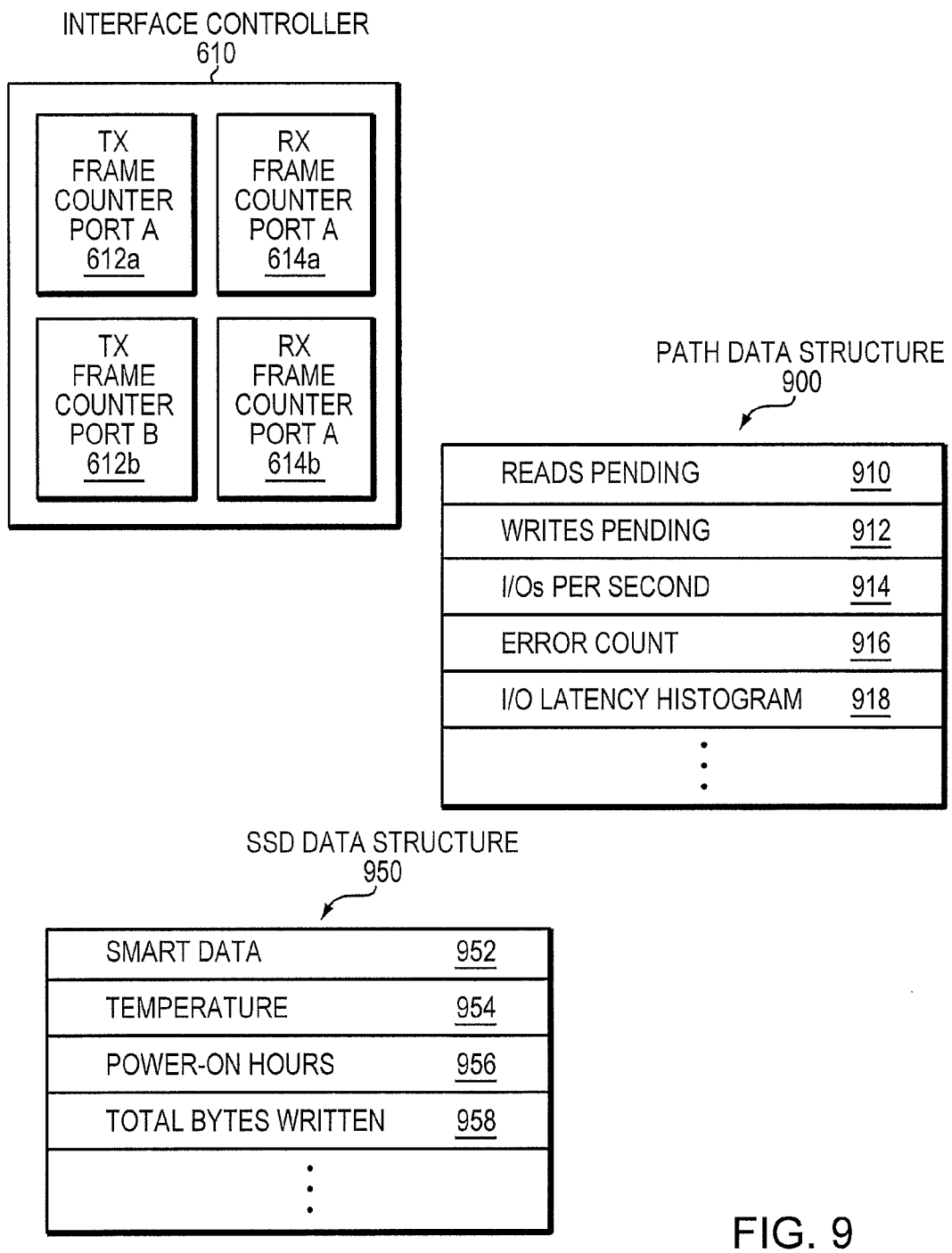
FIG. 9 is a block diagram of data structures used as feedback according to the load balancing technique.

FIG. 9 is a block diagram of data structures used as feedback according to the load balancing technique. Information at various time intervals may be collected and employed as feedback. The interface controller 610 may include transmit (TX) frame counters 612a,b for each port indicating a number of frames sent according to the storage protocol (e.g., SATA) as well as a receive (RX) frame counter 614*a,b* for each port. A path data structure 900 may include fields having information related to the I/O queue 640, such as reads pending count 910, writes pending count 912, IOPs count 914, and an interface error count 916. To smooth transient perturbations for different time intervals, the path data structure may also include an I/O latency histogram 918. In an embodiment, the histogram may include measurements for individual I/O latencies (e.g., latency 840) averaged over various time intervals (e.g., 1 second, 10 seconds, 30 seconds, 60 seconds, and 5 minutes). Further, an SSD data structure 950 may be maintained for each SSD 260 in the storage array. The SSD data structure may include, inter alia, Self-Monitoring, Analysis and Reporting Technology (SMART) data 952 (used for failure prediction); SSD temperature 954 (used by the warmup module 710); power-on hours 956 and total bytes written 958.

In an embodiment, multi-stream SSDs are used as SSDs 260 by the MPIO layer 600 of the storage I/O stack 300. Illustratively, a separate stream may be opened for different workloads, such as frequently access (hot) data, infrequently accessed (cold) data, and metadata. A stream may be aligned to a flash component erase-block and can span one or more erase-blocks. Multiple streams may be opened per SSD (i.e., accessible per interface controller port). The stream may be closed when the entire stream is written. Accordingly, different streams (e.g., data and metadata) may be held open for different durations. The MPIO layer 600 may employ a policy to maintain the stream-open duration as evenly as possible across the different I/O channels. The MPIO stream policy may operate in conjunction with the I/O channel selector such that they run independently, i.e., with a substantially longer feedback loop at a lower priority that than of the I/O channel selector. For instance, the I/O channel selector may employ a 30 second feedback loop, whereas the stream policy may employ a 60 minute feedback loop.

In an embodiment, the stream policy monitors stream-open durations per I/O channel by identifying a first set of SSDs having shorter than average stream-open durations and a second set of SSDs having longer than average stream-open durations. At the stream policy feedback interval (e.g., 60 minutes) primary I/O paths for SSDs in the first set may be swapped (i.e., exchanged) with primary I/O paths for SSDs in the second set such that one or more pairs of SSDs (one from the first set and one from the second set) exchange primary I/O paths. In this manner, stream-open durations may be evened out (i.e., averaged out) across the I/O channels.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, electronic memory, and/or CDs) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
receiving from a host, a plurality of write requests directed towards a logical unit (LUN), each write request having data, the write request processed at a storage system having a memory coupled to a processor via a memory bus, the processor coupled to at least one storage controller attached to at least one shelf of solid state drives (SSDs);
generating an input/output (I/O) workload from the plurality of write requests, the I/O workload including a de-duplication operation;
looking ahead into an I/O queue having the I/O workload to predict an expected load on each I/O channel of a plurality of I/O channels included in the at least one storage controller; and
controlling a back-end latency of the I/O workload to the SSDs by load balancing the I/O workload among the plurality of I/O channels based on the expected work load on each I/O channel, thereby for the plurality of write requests maintaining a predictable front-end latency to the host.

2. The method of claim 1 wherein predicting an expected load on each I/O channel of a plurality of I/O channels further comprises:
using a read/write workload ratio, wherein a first latency associated with a read operation and a second latency associated with a write operation are known, and wherein the I/O workload includes the read operation and the write operation.

3. The method of claim 1, wherein each SSD is associated with a primary I/O path and a secondary I/O path to the at least one storage controller, and wherein the load balancing of the I/O workload includes sending data across the primary I/O path and the secondary I/O path for each SSD.

4. The method of claim 1 wherein the I/O workload includes an unexpected read operation in response to the de-duplication operation.

5. The method of claim 1, wherein each SSD is associated with a primary I/O path and a secondary I/O path to the at least one storage controller, wherein the load balancing of the I/O workload includes sending data across the primary I/O path for each SSD, and wherein the secondary I/O path is a failover I/O path for each SSD.

6. The method of claim 1 further comprising:
reading a temperature of each respective SSD; and
in response to the temperature of the respective SSD being outside of an operating temperature range, issuing a warmup I/O request to the respective SSD.

7. The method of claim 1 wherein load balancing the I/O workload includes calculating a number of I/O operations per second of the workload for each I/O channel.

8. The method of claim 1 wherein load balancing the I/O workload includes calculating an I/O latency histogram of the I/O workload for a plurality of durations.

9. The method of claim 1 wherein load balancing the I/O workload includes examining a reads pending count and a writes pending count indicating a respective number of read and write requests associated with the I/O queue.

10. The method of claim 5 further comprising:
monitoring stream-open durations for a first SSD and a second SSD, wherein the first and second SSDs are multi-streaming; and
in response to the first SSD having stream-open durations greater than an average stream-open duration and the second SSD having stream-open durations less than the average stream-open duration, exchanging a first primary I/O path associated with the first SSD with a second primary I/O path associated with the second SSD.

11. A method comprising:

receiving from a host, a plurality of write request directed towards a logical unit (LUN), each write request having data, the write request processed at a storage system having a memory coupled to a processor via a memory bus, the processor coupled to at least one storage controller attached to at least one shelf of multi-stream solid state drives (SSDs);

generating an input/output (I/O) workload from the plurality of write requests, the workload including the data and metadata associated with the data; and controlling a back-end latency of the I/O workload to the SSDs by load balancing the I/O workload among a plurality of I/O channels included in the at least one storage controller such that the plurality of write requests maintain a predictable front-end latency to the host, wherein a first stream for each SSD is used for the data and a second stream different from the first stream for each SSD is used for the metadata.

12. A system comprising:

a storage system having a memory connected to a processor via a bus;

at least one storage shelf coupled to the processor via at least one storage controller, each storage shelf having a plurality of solid state drives (SSDs);

a storage I/O stack executing on the processor of the storage system, the storage I/O stack configured to:

receive from a host, a plurality of write requests directed towards a logical unit (LUN), each write request having data;

generate an input/output (I/O) workload from the plurality of write requests, the I/O workload including a de-duplication operation;

look ahead into an I/O queue having the I/O workload to predict an expected load on each I/O channel of a plurality of I/O channels included in the at least one storage controller; and control a back-end latency of the I/O workload to the SSDs by load balancing the I/O workload among the plurality of I/O channels based on the expected work load on each I/O channel, thereby for the plurality of write requests maintaining a predictable front-end latency to the host.

13. The system of claim 12 wherein the storage I/O stack configured to predict an expected load on each I/O channel of a plurality of I/O channels is further configured to:

use a read/write workload ratio, wherein a first latency associated with a read operation and a second latency associated with a write operation are known, and wherein the I/O workload includes the read operation and the write operation.

14. The system of claim 12, wherein each SSD is associated with a primary I/O path and a secondary I/O path to the at least one storage controller, and wherein the load balancing of the I/O workload includes sending data across the primary I/O path and the secondary I/O path for each SSD.

15. The system of claim 12 the I/O workload includes an unexpected read operation in response to the de-duplication operation.

16. The system of claim 12, wherein each SSD is associated with a primary I/O path and a secondary I/O path to the at least one storage controller, and wherein the load balancing of the I/O workload includes sending data across the primary I/O path for each SSD, and wherein the secondary I/O path is a failover I/O path for each SSD.

17. The system of claim 12 wherein the storage I/O stack is further configured to:

read a temperature of each respective SSD; and in response to the temperature of the respective SSD being outside of an operating temperature range, issue a warmup I/O request to the respective SSD.

18. The system of claim 12 wherein load balancing the I/O workload includes calculating a number of I/O operations per second of the workload for each I/O channel.

19. The system of claim 12 wherein load balancing the I/O workload includes calculating a I/O latency histogram of the I/O workload for a plurality of durations.

20. The system of claim 12 wherein the load balancing the I/O workload includes examining a reads pending counter and a writes pending counter indicating a respective number of read and write requests associated with the I/O queue.

* * * * *